United States Patent
Hasegawa et al.

(10) Patent No.: US 10,202,299 B2
(45) Date of Patent: Feb. 12, 2019

(54) GLASS FILM RIBBON MANUFACTURING METHOD AND GLASS FILM RIBBON MANUFACTURING DEVICE

(71) Applicant: Nippon Electric Glass Co., Ltd., Shiga (JP)

(72) Inventors: Yoshinori Hasegawa, Shiga (JP); Koichi Mori, Shiga (JP); Hiroshi Naruse, Shiga (JP); Naoya Ishida, Shiga (JP); Hiroki Mori, Shiga (JP); Taisei Matsubushi, Shiga (JP); Akio Nakabayashi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/730,156

(22) Filed: Oct. 11, 2017

(65) Prior Publication Data

US 2018/0044216 A1 Feb. 15, 2018

Related U.S. Application Data

(62) Division of application No. 14/908,718, filed as application No. PCT/JP2014/071972 on Aug. 22, 2014, now Pat. No. 9,932,259.

(30) Foreign Application Priority Data

Aug. 28, 2013 (JP) .................................. 2013-176817
Aug. 28, 2013 (JP) .................................. 2013-176819

(51) Int. Cl.
*C03B 23/02* (2006.01)
*C03B 33/09* (2006.01)
(Continued)

(52) U.S. Cl.
CPC .......... *C03B 23/02* (2013.01); *C03B 33/0235* (2013.01); *C03B 33/033* (2013.01);
(Continued)

(58) Field of Classification Search
CPC ... C03B 23/02; C03B 23/0235; C03B 23/033; C03B 23/091; C03B 23/023; C03B 23/037; C03B 35/16
See application file for complete search history.

(56) References Cited

U.S. PATENT DOCUMENTS 3,543,979 A * 12/1970 Hamer .................. C03B 33/023
219/121.67
3,932,726 A * 1/1976 Verheyen ............... C03B 33/093
219/121.67
(Continued)

FOREIGN PATENT DOCUMENTS

JP 56-65931 6/1981
JP 60-76318 4/1985
(Continued)

OTHER PUBLICATIONS

International Search Report dated Nov. 25, 2014 in International (PCT) Application No. PCT/JP2014/071972.
(Continued)

*Primary Examiner* — Jason L Lazorcik
(74) *Attorney, Agent, or Firm* — Wenderoth, Lind & Ponack, L.L.P.

(57) ABSTRACT

Provided is a glass film ribbon manufacturing device (1), including: a transverse conveyance unit (4), which is configured to convey a glass film ribbon (G) in a transverse direction; and a cleaving unit (5), which is arranged on a conveyance path of the transverse conveyance unit (4), and is configured to cleave the glass film ribbon (G) along a preset cleaving line extending in a longitudinal direction, the
(Continued)

transverse conveyance unit (4) including a wrinkle-smoothing unit (14) configured to smooth a wrinkle generated in the glass film ribbon (G) before the glass film ribbon (G) is cleaved by the cleaving unit (5).

8 Claims, 24 Drawing Sheets

(51) Int. Cl.
    C03B 35/16       (2006.01)
    C03B 33/023      (2006.01)
    C03B 33/033      (2006.01)
(52) U.S. Cl.
    CPC ............ *C03B 33/091* (2013.01); *C03B 35/16* (2013.01); *B65H 2301/5124* (2013.01); *B65H 2601/254* (2013.01); *B65H 2801/61* (2013.01); *Y02P 40/57* (2015.11)

(56) References Cited

U.S. PATENT DOCUMENTS

| | | | | |
|---|---|---|---|---|
| 9,458,047 B2* | 10/2016 | Teranishi | ............ | C03B 33/0235 |
| 2012/0017642 A1* | 1/2012 | Teranishi | ............ | B28D 5/0011 |
| | | | | 65/105 |
| 2012/0024928 A1* | 2/2012 | Matsumoto | ............ | B28D 1/221 |
| | | | | 225/2 |
| 2012/0125967 A1* | 5/2012 | Furuta | ................ | C03B 33/0235 |
| | | | | 225/3 |
| 2012/0131962 A1* | 5/2012 | Mitsugi | ............... | C03B 33/0235 |
| | | | | 65/112 |
| 2012/0247154 A1* | 10/2012 | Abramov | ............ | C03B 33/0235 |
| | | | | 65/54 |
| 2013/0126576 A1* | 5/2013 | Marshall | ............... | C03B 33/033 |
| | | | | 225/2 |
| 2013/0129987 A1* | 5/2013 | Mitsugi | ................ | C03B 35/163 |
| | | | | 428/189 |
| 2014/0054348 A1* | 2/2014 | Teranishi | ............ | C03B 33/0215 |
| | | | | 225/2 |
| 2014/0130649 A1* | 5/2014 | Chang | ................... | C03B 33/033 |
| | | | | 83/26 |
| 2015/0218034 A1* | 8/2015 | Bigelow | .................. | B26D 7/18 |
| | | | | 156/271 |
| 2015/0299019 A1* | 10/2015 | Fujii | .................. | C03B 33/0235 |
| | | | | 65/53 |
| 2015/0315059 A1* | 11/2015 | Abramov | ............ | C03B 33/0235 |
| | | | | 65/176 |
| 2015/0367444 A1* | 12/2015 | Abramov | ........... | B23K 37/0235 |
| | | | | 65/112 |
| 2016/0075589 A1* | 3/2016 | Shi | ........................ | B65H 23/24 |
| | | | | 65/25.2 |

FOREIGN PATENT DOCUMENTS

| | | |
|---|---|---|
| JP | 8-175726 | 7/1996 |
| JP | 2011-116611 | 6/2011 |
| JP | 2011-121791 | 6/2011 |
| JP | 2011-144092 | 7/2011 |
| JP | 2012-96936 | 5/2012 |
| JP | 2012-106898 | 6/2012 |
| JP | 2012-111649 | 6/2012 |
| JP | 2012-211074 | 11/2012 |
| WO | 2012/169002 | 12/2012 |

OTHER PUBLICATIONS

English translation of the International Preliminary Report on Patentability and Written Opinion of the International Searching Authority dated Mar. 1, 2016 in International Application No. PCT/JP2014/071972.
Office Action dated Oct. 4, 2016 in corresponding Japanese Application No. 2013-176819 (with English translation).
Office Action dated Apr. 19, 2017 in corresponding Chinese Application No. 201480031453.9, with English translation of the Search Report.
Extended European Search Report dated Jun. 21, 2017 in counterpart European Patent Application No. 14839514.8.
Extended European Search Report dated Apr. 25, 2018 in corresponding European Patent Application 17199114.4.

* cited by examiner

GLASS FILM RIBBON MANUFACTURING METHOD AND GLASS FILM RIBBON MANUFACTURING DEVICE

TECHNICAL FIELD

The present invention relates to a technology for cleaving a glass film ribbon while conveying the glass film ribbon in a proper state when cleaving the glass film ribbon by a cleaving unit, which is arranged on a conveyance path of a transverse conveyance unit, along a preset cleaving line extending in a longitudinal direction while conveying the glass film ribbon in a transverse direction by the transverse conveyance unit.

BACKGROUND ART

As is well known, thinning of glass sheets to be used in flat panel displays (FPD) such as a liquid crystal display, a plasma display, and an OLED display, glass sheets to be used in OLED illumination, glass sheets to be used for manufacturing a tempered glass that is a component of a touch panel, and the like, and glass sheets to be used in panels of solar cells, and the like has been promoted in the current circumstances.

In order to address such current circumstances, in recent years, those glass sheets have been developed so as to be used as glass films having a thickness of 300 μm or less or 200 μm or less. To manufacture this type of glass films, as examples, a down-draw method typified by an overflow down-draw method, a slot down-draw method, and a re-draw method, and a float method have been used.

Those methods involve forming a glass film ribbon by a forming unit through use of a molten glass as a material, drawing the glass film ribbon from the forming unit, and then removing an unnecessary portion of the glass film ribbon by cleaving while conveying the glass film ribbon in a transverse direction by a transverse conveyance unit, to thereby form a glass roll. Specifically, the glass film ribbon is cleaved along a preset cleaving line extending in a longitudinal direction in such a manner that each unnecessary portion including a thick selvage portion both end portions in a width direction of the glass film ribbon that is being conveyed in the transverse direction by the transverse conveyance unit is removed by cleaving with a cleaving unit from the glass film ribbon, and then, one or a plurality of glass film ribbons serving as effective portions are taken up into one or a plurality of glass rolls (see Patent Literature 1 regarding the down-draw method).

Further, in addition to the foregoing, in the case where the glass film ribbon is taken up into a glass roll without removing the unnecessary portion including the selvage portion by cleaving, or in the case where the glass film ribbon is taken up into a glass roll after the unnecessary portion including the selvage portion is removed by cleaving, the glass film ribbon may be conveyed in the transverse direction by the transverse conveyance unit while being taken out from one glass roll and taken up into the other glass roll in a roll-to-roll process.

Also in this type of roll-to-roll process, the glass film ribbon is cleaved along the preset cleaving line extending in the longitudinal direction in such a manner that an unnecessary portion in each of both end portions in the width direction of the glass film ribbon is removed by cleaving with the cleaving unit while the glass film ribbon is being conveyed in the transverse direction by the transverse conveyance unit, and then one or a plurality of glass film ribbons serving as effective portions are taken up into one or a plurality of glass rolls.

CITATION LIST

Patent Literature 1: JP 2012-211074 A
Patent Literature 2: JP 2012-111649 A

SUMMARY OF INVENTION

Technical Problem

Incidentally, in the above-mentioned cleaving of the glass film with the cleaving unit, as an example, a laser cleaving method has been widely employed. In this laser cleaving method, cleaving is performed through use of thermal stress. Then, considering the above-mentioned two types of glass roll manufacturing methods, the position of the cleaving unit using the laser cleaving method is generally defined, in the former case, to be the position on the transverse conveyance unit after the glass film ribbon is drawn from the forming unit (in the down-draw method, after the glass film ribbon further passes through a direction changing unit), and is generally defined, in the latter case, to be the position on the transverse conveyance unit configured to convey the glass film ribbon in the transverse direction while taking out the glass film ribbon from one glass roll and taking up the glass film ribbon into the other glass roll.

In this case, the glass film ribbon has flexibility, thereby causing a problem in that wrinkles are generated in the glass film ribbon while the glass film ribbon is being conveyed in the transverse direction by the transverse conveyance unit. When the wrinkles are generated in the glass film ribbon as described above, a minute bending stress is generated in the wrinkles and the vicinity thereof, and hence an unexpected bending stress caused by the wrinkles may be applied in addition to the thermal stress during the laser cleaving. As a result, there may arise a problem of difficulty in achieving stable laser cleaving.

Note that, in Patent Literature 2, there is disclosed a configuration including an air supply unit (air knife) configured to push, at an upstream position of a laser cleaving position, a waviness, which is caused by the wrinkles generated in the glass film ribbon, to an upstream side of the laser cleaving position while the glass film ribbon is being conveyed in the transverse direction by the transverse conveyance unit. However, the air supply unit does not eliminate the waviness caused by the wrinkles but moves the wrinkles (waviness) to the upstream side from the laser cleaving position.

Therefore, as also presumed from FIGS. 1 of Patent Literature 2, in the case where the wrinkles are excessively moved to the upstream side from the laser cleaving position by the air supply unit, it is predicted that the wrinkles arrive at the direction changing unit of the glass film ribbon (part in which the moving direction changes from a vertical direction to the transverse direction) or the vicinity thereof. When such situation occurs, for example, the glass film ribbon wobbles on the periphery of the direction changing unit due to the arrival of the wrinkles. Therefore, there is a risk in that the glass film ribbon formed by the forming unit including a forming trough and an annealer may also be adversely affected by wobbling or the like.

From such viewpoint, a first object of the present invention is to reliably suppress a cleaving defect in a cleaving unit caused by wrinkles generated in a glass film ribbon that is being conveyed in a transverse direction by a transverse conveyance unit of a device.

Meanwhile, after the glass film ribbon is cleaved at the above-mentioned transverse conveyance unit, an effective portion is sent to a take-up unit of a glass roll, and an unnecessary portion is sent to a disposal unit or the like. In this case, it is necessary to prevent an inappropriate stress from acting on a cleaving position immediately after cleaving of the glass film ribbon. For this purpose, it is preferred that the unnecessary portion be supported from below by an unnecessary portion supporting part.

Under such circumstances, in the case where a selvage portion that is thicker than the effective portion is formed in an end portion on an outer side in the width direction of the unnecessary portion, the following problem occurs when the unnecessary portion is to be sent to the disposal unit or the like in a state of being supported from below by the unnecessary portion supporting part.

That is, the selvage portion is put into a wavy state so that a convex portion and a concave portion continue repeatedly in a sending direction, and hence wrinkles are generated on an inner side in the width direction of the selvage portion before cleaving of the glass film ribbon. Then, after cleaving of the glass film ribbon, apart including the selvage portion, in which the wrinkles have been generated, becomes the unnecessary portion. In the case where the entire unnecessary portion is supported from below by the unnecessary portion supporting part, the unnecessary portion is put into a state of being floated from the unnecessary portion supporting part in any of the selvage portion and the periphery on the inner side in the width direction thereof.

When the unnecessary portion is to be sent in such supported state, vibration occurs on the inner side in the width direction of the selvage portion of the unnecessary portion, which causes a situation in which a cleaving end surface of the unnecessary portion and a cleaving end surface of the effective portion rub against each other frequently. As a result, cracks and the like occur in the cleaving end surface of the effective portion (product portion), and breakage is originated from the cracks and the like, resulting in not only the degradation in quality of the effective portion but also the decrease in productivity.

Further, even in the case where the selvage portion is not formed in the unnecessary portion, it is required that the cleaving end surface of the unnecessary portion and the cleaving end surface of the effective portion be prevented from rubbing against each other, and that the unnecessary portion and the effective portion be separated smoothly.

From such viewpoint, a second object of the present invention is to suppress interference between a cleaving end surface of an unnecessary portion and a cleaving end surface of an effective portion by appropriately supporting the unnecessary portion after cleaving the glass film ribbon into the unnecessary portion and the effective portion while conveying the glass film ribbon in the transverse direction by the transverse conveyance unit.

Solution to Problem

According to one embodiment of the present invention, which is devised to attain the above-mentioned first object, there is provided a glass film ribbon manufacturing method, comprising: cleaving a glass film ribbon by a cleaving unit, which is arranged on a conveyance path of a transverse conveyance unit, along a preset cleaving line extending in a longitudinal direction while conveying the glass film ribbon in a transverse direction by the transverse conveyance unit; and smoothing, before the cleaving the glass film ribbon by the cleaving unit, a wrinkle generated in the glass film ribbon by a wrinkle-smoothing unit arranged in the transverse conveyance unit. The above-mentioned term "transverse direction" herein refers to a horizontal direction, or a direction inclined upward or downward with respect to the horizontal direction within a range of less than 45° (preferably, a direction inclined within a range of less than 30°) (the same applies hereinafter).

With such configuration, even when wrinkles are generated in the glass film ribbon that is being conveyed in the transverse direction by the transverse conveyance unit, the wrinkles are smoothed by the wrinkle-smoothing unit arranged in the transverse conveyance unit before the glass film ribbon is cleaved by the cleaving unit. Therefore, the wrinkles generated in the glass film ribbon are eliminated properly, and thereafter, the glass film ribbon is cleaved along the preset cleaving line extending in the longitudinal direction by a laser cleaving method or the like. Therefore, an inappropriate bending stress or the like is not generated in the glass film, and satisfactory cleaving may be performed stably. Note that, in a configuration in which the glass film ribbon is conveyed by the transverse conveyance unit via a direction changing unit from a forming unit, the wrinkles generated in the glass film are smoothed and eliminated with the wrinkle-smoothing unit. Therefore, a situation in which the wrinkles are pushed to an upstream side to arrive at the direction changing unit or the vicinity thereof does not occur. Thus, for example, the glass film ribbon does not wobble in the direction changing unit owing to the wrinkles, thereby eliminating a risk in that the forming unit is adversely affected.

In such configuration, it is preferred that the wrinkle-smoothing unit be arranged on a lower surface side of the glass film ribbon conveyed by the transverse conveyance unit.

With this, a free space above the glass film ribbon in the transverse conveyance unit becomes larger, with the result that the space may be used effectively, and the interference between the wrinkle-smoothing unit and the cleaving unit is avoided. Thus, problems in terms of layout are solved.

In the above-mentioned configuration, it is preferred that the wrinkle-smoothing unit be configured to smooth the wrinkle by causing an orthogonal rod-like body, which is arranged on an upstream side of a cleaving position for the glass film ribbon to be cleaved by the cleaving unit so as to extend in a direction orthogonal to a conveyance direction of the glass film ribbon, to lift up the glass film ribbon from the lower surface side. The term "rod-like body" herein encompasses a hollow (pipe-like) rod-like body as well as a solid rod-like body (the same applies hereinafter).

With this, the wrinkles generated on the upstream side of the cleaving position of the glass film ribbon are mostly smoothed and eliminated while the glass film ribbon is being conveyed so as to run on the orthogonal rod-like body extending in the direction orthogonal to the conveyance direction. In other words, when the glass film ribbon is lifted up from the lower surface side with the orthogonal rod-like body, the wrinkles generated in the glass film ribbon are smoothed with an action of the lift-up force. Thus, of the wrinkles generated in the glass film ribbon, irregular wrinkles having various directivities are smoothed efficiently over a wide range.

In place of or in addition to such configuration, it is preferred that the wrinkle-smoothing unit be configured to smooth the wrinkle by causing a parallel rod-like body, which is arranged in a region from the upstream side to a downstream side of the cleaving position for the glass film ribbon to be cleaved by the cleaving unit so as to extend in a direction parallel to the conveyance direction of the glass film ribbon, to lift up each of both end portions in a width direction of the glass film ribbon from the lower surface side.

With this, the wrinkles generated in the glass film ribbon along the conveyance direction are smoothed and eliminated in such a manner that the wrinkles are pulled into both the end portions in the width direction of the glass film ribbon while the glass film ribbon is being conveyed so as to run on the parallel rod-like body extending in each of both the end portions in the width direction in parallel with the conveyance direction. In other words, when the glass film ribbon is lifted up from the lower surface side with the parallel rod-like body in each of both the end portions in the width direction, the wrinkles generated in the glass film ribbon along the conveyance direction are smoothed toward both end sides in the width direction due to an action of the lift-up force. Thus, of the wrinkles generated in the glass film ribbon, in particular, the wrinkles along the conveyance direction are smoothed reliably and efficiently. Further, the parallel rod-like body is arranged over the region from the upstream side to the downstream side of the cleaving position. Therefore, the parallel rod-like body causes the lift-up force to act on a cleaving part even after cleaving is performed, and hence opposing cleaving end surfaces in the cleaving part are to be separated from each other. Thus, the occurrence of damages and cracks caused by the contact between the opposing cleaving end surfaces in the cleaving part is avoided effectively, with the result that the cleaving end surfaces having proper properties can be ensured.

In place of or in addition to the above-mentioned configurations, it is preferred that the wrinkle-smoothing unit comprise a bedplate, which is arranged in a region from the upstream side to the downstream side of the cleaving position for the glass film ribbon to be cleaved by the cleaving unit, and is configured to support the glass film ribbon from the lower surface side, and to float both the end portions in the width direction of the glass film ribbon while extending off both ends in the width direction of the bedplate.

With this, both the end portions in the width direction of the glass film ribbon are floated while extending off both the ends in the width direction of the bedplate, which supports the glass film ribbon from the lower surface side, and hence a tensile force directed to both the end sides in the width direction acts on the glass film ribbon due to the weight of the extended portions. Therefore, the wrinkles generated in the glass film ribbon along the conveyance direction are smoothed toward both the end sides in the width direction from a center portion in the width direction due to the above-mentioned tensile force. Thus, of the wrinkles generated in the glass film ribbon, in particular, the wrinkles along the conveyance direction are smoothed reliably and efficiently. Further, the bedplate is arranged over the region from the upstream side to the downstream side of the cleaving position, and hence the extended portions of the glass film ribbon are to be pulled toward both the end sides in the width direction even after cleaving is performed. Thus, a force for separating the opposing cleaving end surfaces in the cleaving part from each other is applied. Thus, the occurrence of damages and cracks caused by the contact between the opposing cleaving end surfaces in the cleaving part is avoided effectively, with the result that the cleaving end surfaces having proper properties can be ensured.

In this case, it is preferred that an upper surface of the bedplate be formed so that both end portions in the width direction of the bedplate are lower in height than a center portion in the width direction of the bedplate.

With this, the tensile force directed to both the end sides in the width direction is allowed to act on the glass film ribbon more reliably due to the weight of the extended portions.

In place of or in addition to the above-mentioned configurations, it is preferred that the wrinkle-smoothing unit be configured to smooth the wrinkle by causing a raising body, which is arranged in a region including the cleaving position for the glass film ribbon to be cleaved by the cleaving unit and extending from the cleaving position to each of the upstream side and the downstream side, to lift up the glass film ribbon from the lower surface side.

With this, a part of the glass film ribbon extending from the upstream side to the downstream side, including the cleaving position, is lifted up from the lower surface side with the raising body, and hence the periphery of the cleaving position of the glass film ribbon to be cleaved by the cleaving unit is allowed to have tension. Thus, the wrinkles generated before cleaving of the glass film ribbon are eliminated effectively when the periphery of the cleaving position is allowed to have tension. Such action and effect are obtained remarkably as the thickness of the glass film ribbon decreases.

In the above-mentioned configurations, it is preferred that the transverse conveyance unit further comprise a holding body arranged at a position corresponding to each of both the end portions in the width direction of the glass film ribbon, and that the holding body be configured to hold the each of both the end portions in the width direction of the glass film ribbon from above when the wrinkle-smoothing unit supports both the end portions in the width direction of the glass film ribbon in a floated state.

With this, when the glass film ribbon is transversely conveyed, the situation in which vibration occurs in both the end portions in the width direction, and the situation in which the vibration has an adverse effect on the cleaving of the glass film ribbon are avoided effectively. That is, generally in both the end portions in the width direction of the glass film ribbon, parts that are to be convex upward and parts that are to be convex downward are repeatedly formed adjacently in the longitudinal direction during the transverse conveyance. In the current circumstances, the following situation has occurred. Along with the conveyance, the parts that are convex upward are inverted to parts that are convex downward, and the parts that are convex downward are inverted to the parts that are convex upward. When such situation occurs, vibration occurs in both the end portions in the width direction of the glass film ribbon, and the vibration propagates to the cleaving position. Therefore, there arises a serious problem in that the cleaving with the cleaving unit is inevitably stopped. However, in the present invention, both the end portions in the width direction of the glass film ribbon are each held from above by the holding body so that all the parts that are convex upward and the parts that are convex downward are kept convex downward forcibly, and thus the transverse conveyance can be performed in such state. Accordingly, the phenomenon in which the parts that are to be convex upward and the parts that are to be convex downward are inverted may not occur, and along with this, the occurrence of vibration is suppressed, with the result that cleaving with the cleaving unit is performed smoothly and satisfactorily.

In the above-mentioned configurations, the wrinkle-smoothing unit may be constructed by arranging each parallel rod-like body on the downstream side of the orthogonal rod-like body.

With this, the action and effect obtained by arranging the orthogonal rod-like body described above and the action and effect obtained by arranging the parallel rod-like body can be obtained at once simultaneously.

In the above-mentioned configurations, the wrinkle-smoothing unit may be constructed by arranging the bedplate on the downstream side of the orthogonal rod-like body and mounting the parallel rod-like body in an upper portion of each of both the end portions in the width direction of the bedplate.

With this, the wrinkles generated in the glass film ribbon along the conveyance direction can be smoothed more reliably by mounting the parallel rod-like body in the upper portion of each of both the end portions in the width direction of the bedplate, and in addition, the wrinkles having various directivities can be smoothed efficiently over a wider range by arranging those components on the downstream side of the orthogonal rod-like body.

In the above-mentioned configurations, the wrinkle-smoothing unit may be constructed by arranging the bedplate on the downstream side of the orthogonal rod-like body and mounting each raising body in an upper portion of a part corresponding to the cleaving position of the bedplate.

With this, the periphery of the cleaving position of the thin glass film ribbon, in particular, is lifted up and allowed to have tension by mounting each raising body in the upper portion of the part corresponding to the cleaving position of the bedplate, and in addition, the wrinkles having various directivities can be smoothed efficiently over a wider range by arranging those components on the downstream side of the orthogonal rod-like body.

In the above-mentioned configurations, each holding body may be arranged on the downstream side of the orthogonal rod-like body and on an outer side in the width direction of the parallel rod-like body.

With this, the wrinkles generated in the glass film ribbon are smoothed, and in addition, the vibration that occurs in both end portions of the glass film ribbon is suppressed by the holding body, with the result that trouble does not occur in cleaving of the glass film ribbon.

In the above-mentioned configurations, it is preferred that the wrinkle-smoothing unit be installed at a fixed position.

With this, the action and effect obtained by the wrinkle-smoothing unit described above may be exhibited effectively without complicating the configuration.

In the above-mentioned configurations, the transverse conveyance unit may further comprise a conveyance sheet ribbon having flexibility, which is interposed between the wrinkle-smoothing unit and the glass film ribbon, and the conveyance sheet ribbon may be configured to convey the glass film ribbon by moving a lower surface of the conveyance sheet ribbon while sliding on the wrinkle-smoothing unit.

With this, the glass film ribbon and the wrinkle-smoothing unit do not slide in contact with each other, and hence trouble such as the occurrence of scars or breakage in the glass film ribbon is avoided, and the glass film ribbon can be conveyed smoothly. In this case, it is preferred that the wrinkle-smoothing unit be installed at the fixed position, and that the conveyance speed of the conveyance sheet ribbon be equal to the conveyance speed of the glass film ribbon.

In the above-mentioned configurations, there may be provided a direction changing unit, which is arranged on an upstream side of the transverse conveyance unit, and is configured to change a direction of conveyance of the glass film ribbon drawn vertically downward from a forming unit into the transverse direction.

With this, an operation of the wrinkle-smoothing unit for smoothing the wrinkles generated in the glass film ribbon does not have an adverse effect such as wobbling on the direction changing unit, thereby eliminating a risk in that a forming defect and the like are caused in the forming unit.

In the above-mentioned configurations, there may be provided a roll take-up unit, which is arranged on a downstream side of the transverse conveyance unit, and is configured to take up the glass film ribbon in a state of laminating the glass film ribbon on a protective sheet.

With this, an operation of the wrinkle-smoothing unit for smoothing the wrinkles generated in the glass film ribbon does not have an adverse effect on take-up of the glass film ribbon in the roll take-up unit, with the result that a high-quality glass roll taken up properly can be obtained.

Further, according to one embodiment of the present invention, which is devised to attain the above-mentioned first object, there is provided a glass film ribbon manufacturing device, comprising: a transverse conveyance unit, which is configured to convey a glass film ribbon in a transverse direction; and a cleaving unit, which is arranged on a conveyance path of the transverse conveyance unit, and is configured to cleave the glass film ribbon along a preset cleaving line extending in a longitudinal direction, the transverse conveyance unit comprising a wrinkle-smoothing unit configured to smooth a wrinkle generated in the glass film ribbon before the glass film ribbon is cleaved by the cleaving unit.

In the device having such configuration, the same action and effect as those of the corresponding method according to the one embodiment of the present invention described above can be obtained.

On the other hand, according to one embodiment of the present invention, which is devised to attain the above-mentioned second object, there is provided a glass film ribbon manufacturing method, comprising: cleaving a glass film ribbon by a cleaving unit, which is arranged on a conveyance path of a transverse conveyance unit, along a preset cleaving line defining a boundary line between an unnecessary portion on at least one end side in a width direction of the glass film ribbon and an effective portion on a center side in the width direction of the glass film ribbon while conveying the glass film ribbon in a transverse direction by the transverse conveyance unit; and supporting, after the cleaving the glass film ribbon by the cleaving unit, the unnecessary portion by an unnecessary portion supporting part having a gap in the width direction from the effective portion.

With such configuration, after the glass film ribbon conveyed in the transverse direction by the transverse conveyance unit is cleaved into the effective portion and the unnecessary portion, the unnecessary portion is sent in a state of being supported by the unnecessary portion supporting part having the gap in the width direction from the effective portion. That is, in a state in which the unnecessary portion is supported by the unnecessary portion supporting part, at least an end portion on the cleaving side of the unnecessary portion is put into a state of not being supported due to the presence of the gap in the width direction.

Therefore, the end portion on the cleaving side of the unnecessary portion hangs down due to the own weight thereof, and thus a cleaving end surface of the unnecessary portion and a cleaving end surface of the effective portion are separated from each other in a vertical direction. As a result, the situation in which the cleaving end surface of the unnecessary portion and the cleaving end surface of the effective portion rub against each other is avoided, and the quality of the cleaving end surface of the effective portion (product portion) and the productivity are enhanced. Note that, it is preferred that the unnecessary portion be supported by the unnecessary portion supporting part in surface contact therewith.

In such configuration, the unnecessary portion may have a selvage portion that is thicker than the effective portion, and the unnecessary portion supporting part may be configured to support the unnecessary portion in a state in which the selvage portion protrudes to an outer side in the width direction.

With this, the selvage portion in the unnecessary portion is put into a state of not being supported by the unnecessary portion supporting part, and hence an inner side in the width direction portion thereof, excluding the selvage portion in a wavy state, is supported by the unnecessary portion supporting part. As a result, a part in which the wrinkles have been generated before cleaving is supported by the unnecessary portion supporting part to be in a stably supported state. Therefore, even if the unnecessary portion is to be sent, there is no risk in that vibration and the like occur on the inner side in the width direction of the selvage portion. Further, in a state in which the unnecessary portion is supported by the unnecessary portion supporting part, the selvage portion having a large weight is to hang down due to the own weight thereof, and hence the unnecessary portion is to be generally separated from the effective portion. As a result, the probability of occurrence of the situation in which the cleaving end surface of the effective portion and the cleaving end surface of the unnecessary portion rub against each other frequently is reduced reliably.

In the above-mentioned configurations, the unnecessary portion supporting part may be configured to support a position closer to the outer side in the width direction of the unnecessary portion.

With this, the length of the inner side portion in the width direction of the unnecessary portion, which is not supported by the unnecessary portion supporting part, can be set to be large, and hence the end portion on the cleaving side of the unnecessary portion is allowed to hang down sufficiently due to the own weight thereof. As a result, the separation distance between the cleaving end surface of the effective portion and the cleaving end surface of the unnecessary portion can be further increased to prevent the cleaving end surfaces from rubbing against each other more reliably.

In the above-mentioned configurations, it is preferred that the unnecessary portion supporting part have a length in the width direction of from 0.1 time to 2.0 times of a length in the width direction of the gap in the width direction.

That is, when the above-mentioned numerical value is less than 0.1 time, the length in the width direction of the unnecessary portion supporting part becomes excessively smaller, thereby causing a risk in that the support itself of the unnecessary portion may become unstable. In contrast, when the above-mentioned numerical value is more than 2.0 times, the gap in the width direction becomes insufficient, thereby causing a risk in that the end portion on the cleaving side of the unnecessary portion may hang down insufficiently. Thus, when the numerical value falls within the above-mentioned range, those troubles can be avoided. From the viewpoint described above, the above-mentioned numerical value is more preferably from 0.2 time to 0.5 time, still more preferably from 0.25 time to 0.3 time.

In the above-mentioned configurations, the effective portion may be supported by an effective portion supporting part in a state in which both end portions in the width direction of the effective portion each protrude to the outer side in the width direction.

With this, the effective portion is sent to a take-up unit side of a glass roll with a conveyance force originally generated by the transverse conveyance unit, and in this case, the effective portion is supported by the effective portion supporting part immediately after cleaving of the glass film ribbon. Then, the effective portion supporting part is configured to support the effective portion in a state in which both the end portions in the width direction thereof each protrude to the outer side in the width direction. Therefore, in spite of the fact that the effective portion is supported by the effective portion supporting part, an edge of the cleaving end surface of the effective portion is put into a state of not being held in contact with the effective portion supporting part. As a result, the cleaving end surface of the effective portion may not be directly influenced by an external force from the effective portion supporting part, and cracks and the like caused by sliding between the edge and the effective portion supporting part do not occur in the cleaving end surface of the effective portion. Thus, the cleaving end surface is protected effectively. Note that, it is preferred that the protruding dimension of the effective portion from the effective portion supporting part in this case be reduced to such a degree that both the end portions in the width direction of the effective portion do not hang down due to the own weight thereof. Note that, it is preferred that the effective portion be supported by the effective portion supporting part in surface contact therewith.

In this case, it is preferred that a distance between a conveyance track of the unnecessary portion, which is formed by the unnecessary portion supporting part, and a conveyance track of the effective portion, which is formed by the effective portion supporting part, be gradually increased in a vertical direction as approaching to a downstream side in a conveyance direction.

With this, the separation between the effective portion and the unnecessary portion is further accelerated, and in addition, it is advantageous in performing final disposal and the like of the unnecessary portion.

In the above-mentioned configurations, the unnecessary portion supporting part and the effective portion supporting part may be formed to protrude from a downstream end in the conveyance direction of a surface plate installed at a fixed position along the conveyance path of the transverse conveyance unit.

With this, after the glass film ribbon is cleaved while being conveyed on the surface plate, the effective portion can be sent in a state of being supported by the effective portion supporting part, and the unnecessary portion can be sent in a state of being supported by the unnecessary portion supporting part. As a result, a series of operations from cleaving of the glass film ribbon to sending of the effective portion and the unnecessary portion can be performed smoothly.

In this case, the transverse conveyance unit may further comprise a conveyance sheet ribbon having flexibility, which is interposed between each of the surface plate, the unnecessary portion supporting part, and the effective portion supporting part and the glass film ribbon, and the conveyance sheet ribbon may be configured to convey the glass film ribbon by moving a lower surface of the conveyance sheet ribbon while sliding on the surface plate, the unnecessary portion supporting part, and the effective portion supporting part.

With this, the glass film ribbon (including the unnecessary portion and the effective portion after cleaving) and each of the surface plate, the unnecessary portion supporting part, and the effective portion supporting part do not slide in contact with each other, and hence trouble such as the occurrence of scars or breakage in the glass film ribbon is avoided, and the glass film ribbon can be conveyed smoothly.

Further, according to one embodiment of the present invention, which is devised to attain the above-mentioned second object, there is provided a glass film ribbon manufacturing device configured to cleave a glass film ribbon by a cleaving unit, which is arranged on a conveyance path of a transverse conveyance unit, along a preset cleaving line defining a boundary line between an unnecessary portion on at least one end side in a width direction of the glass film ribbon and an effective portion on a center side in the width direction of the glass film ribbon while conveying the glass film ribbon in a transverse direction by the transverse conveyance unit, wherein, after the glass film ribbon is cleaved by the cleaving unit, the unnecessary portion is supported by an unnecessary portion supporting part having a gap in the width direction from the effective portion.

In the device having such configuration, the same action and effect as those of the corresponding method according to the one embodiment of the present invention described above can be obtained.

Advantageous Effects of Invention

As described above, according to the one embodiment of the present invention, which is devised to attain the first object, a cleaving defect in the cleaving unit caused by the wrinkles generated in the glass film ribbon that is being conveyed in the transverse direction by the transverse conveyance unit of the device can be suppressed reliably. Further, according to the one embodiment of the present invention, which is devised to attain the second object, after the glass film ribbon is cleaved into the unnecessary portion and the effective portion while being conveyed in the transverse direction by the transverse conveyance unit, the unnecessary portion is appropriately supported, and the interference between the cleaving end surface of the unnecessary portion and the cleaving end surface of the effective portion is suppressed to the extent possible.

DESCRIPTION OF EMBODIMENTS

Now, a glass film ribbon manufacturing device (hereinafter referred to simply as "manufacturing device") and a glass film manufacturing method according to embodiments of the present invention are described with reference to the drawings.

Figure 1:
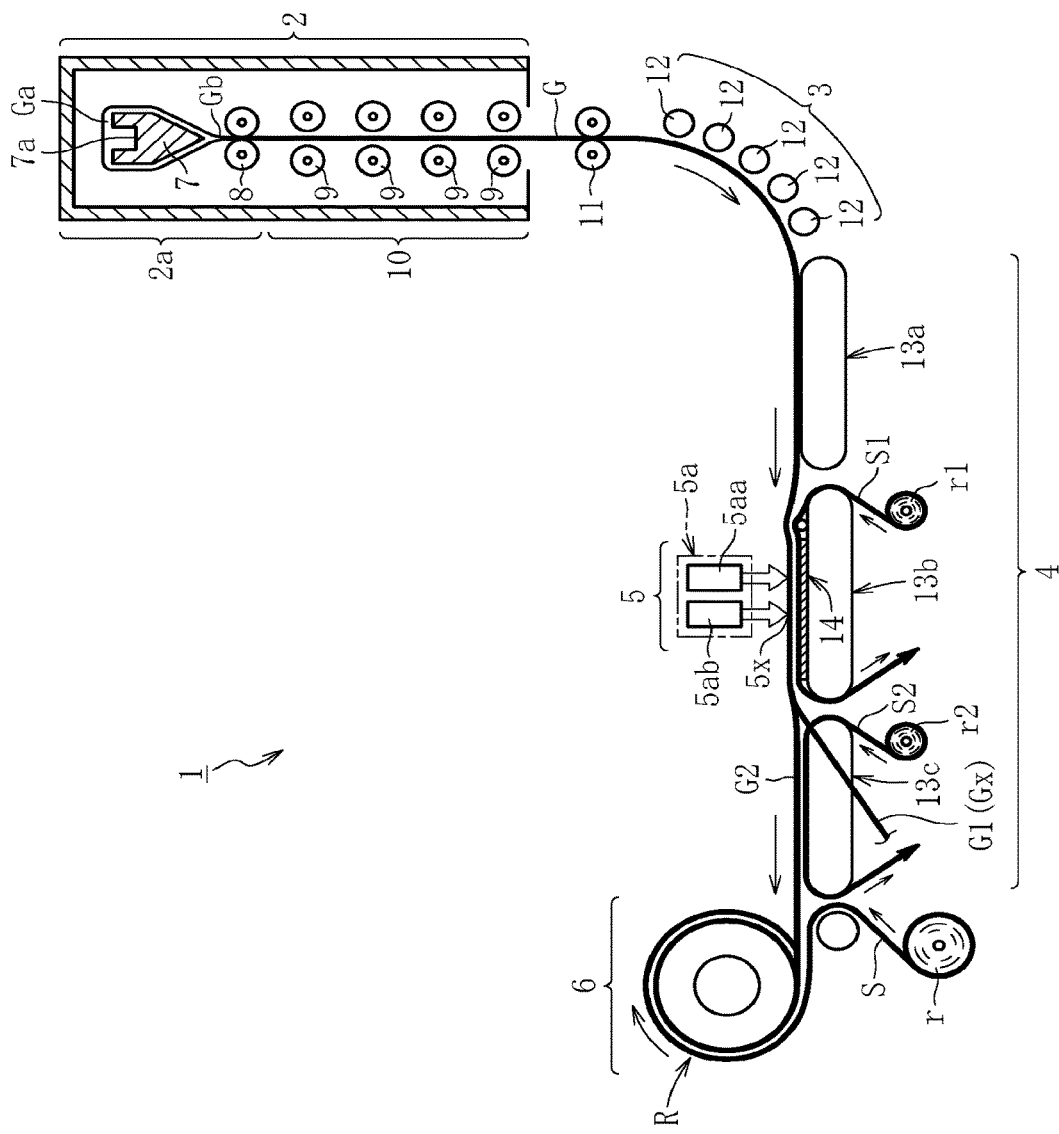
FIG. 1 is a schematic side view for illustrating an entire configuration of a glass film ribbon manufacturing device according to a first embodiment of the present invention.

FIG. 1 is a schematic side view for schematically illustrating an entire configuration of a manufacturing device 1 according to a first embodiment of the present invention. As illustrated in FIG. 1, the manufacturing device 1 comprises, as main components, a forming unit 2 configured to form a glass film ribbon G, a direction changing unit 3 configured to change a moving direction of the glass film ribbon G from a vertically downward direction to a transverse direction, a transverse conveyance unit 4 configured to convey the glass film ribbon G in the transverse direction after the direction change, a cleaving unit 5 configured to cleave an unnecessary portion G1 including a selvage portion Gx of the glass film ribbon G that is being conveyed in the transverse direction by the transverse conveyance unit 4, and a take-up unit 6 configured to take up an effective portion G2 of the glass film ribbon G, which is obtained by removing the unnecessary portion G1 by cleaving with the cleaving unit 5, into a roll shape, to thereby manufacture a glass roll R. Note that, it is preferred that the thickness of the effective portion G2 of the glass film ribbon G be 300 μm or less, 200 μm or less, or 100 μm or less.

The forming unit 2 comprises a forming trough 7 having a substantially wedge shape in cross-section, in which an overflow groove 7a is formed in an upper end portion, cooling rollers 8 arranged immediately below the forming trough 7 and configured to hold a ribbon-like molten glass Gb from both front and back sides, and an annealer 10 arranged immediately below the cooling rollers 8 and comprising annealer rollers 9 arranged in a plurality of stages in a vertical direction. Specifically, a main forming part 2a, which is defined focusing on the action of the forming unit 2, comprises the forming trough 7 configured to cause the molten glass Ga overflowing from the top of the overflow groove 7a to flow downward along both side surfaces thereof and to be joined at a lower end thereof, to thereby form the ribbon-like molten glass Gb, and the cooling rollers 8 configured to form the glass film ribbon G having a predetermined width by regulating contraction in a width direction of the ribbon-like molten glass Gb. Further, the annealer 10 configured to subject the glass film ribbon G to distortion removing treatment is provided below the main forming part 2a. In this manner, the forming unit 2 is constructed.

Tension rollers 11 configured to hold the glass film ribbon G from both front and back sides are arranged below the annealer 10 so that tension for accelerating the reduction in thickness of the glass film ribbon G is applied to a portion between the tension rollers 11 and the cooling rollers 8 or a portion between the tension rollers 11 and the annealer rollers 9 located at any one position. Note that, in the case where the thickness of the glass film ribbon G is large, the tension rollers 11 serve as support rollers configured to prevent the downward stretching of the glass film ribbon G due to the own weight thereof.

The direction changing unit 3 configured to change the moving direction of the glass film ribbon G from the vertically downward direction to the transverse direction is arranged below the tension rollers 11. In the direction changing unit 3, a plurality of guide rollers 12 serving as guide members configured to guide the direction change of the glass film ribbon G are arranged in a curved shape on the back surface side of the glass film ribbon G, and the guide rollers 12 are held in contact with the back surface of the glass film ribbon G. Note that, the guide rollers 12 may support the glass film ribbon G in a non-contact manner by jetting an air stream or the like onto the back surface of the glass film ribbon G. Further, one guide member serving as a belt conveyor formed into a curved shape may be used. Alternatively, the guide members may not be arranged in the direction changing unit 3, and the glass film ribbon G may be designed to change its direction without being influenced by an external force from the back surface side. Further, part of the plurality of guide rollers 12 may be held in contact with the back surface of the glass film ribbon G. Further, the guide rollers 12 may support only part (for example, both end portions in the width direction) of the glass film ribbon G.

The transverse conveyance unit 4 configured to convey the glass film ribbon G in the transverse direction is arranged at a portion of a conveyance path on a downstream side of the direction changing unit 3. In the transverse conveyance unit 4, three belt conveyors 13a, 13b, and 13c are arranged in series in a conveyance direction. Specifically, the transverse conveyance unit 4 comprises a stationary conveyor 13b that is always stopped, a first drive conveyor 13a configured to be driven to rotate and arranged on an upstream side of the stationary conveyor 13b at a position between the stationary conveyor 13b and the direction changing unit 3, and a second drive conveyor 13c configured to be driven to rotate and arranged on a downstream side of the stationary conveyor 13b at a position between the stationary conveyor 13b and the take-up unit 6. Thus, the first drive conveyor 13a serving as a conveyance unit, the stationary conveyor 13b installed at a fixed position so as not to be driven, and the second drive conveyor 13c serving as a conveyance unit are arranged adjacently in an order from the upstream side in the portion between the direction changing unit 3 and the take-up unit 6. Note that, although the transverse conveyance unit 4 is configured to convey the glass film ribbon G (including the effective portion G2 after cleaving) in a horizontal direction in this embodiment, the transverse conveyance unit 4 may be inclined upward or downward with respect to the horizontal direction within a range of less than 45° (preferably, within a range of less than 30°).

A wrinkle-smoothing unit 14 configured to smooth wrinkles generated in the glass film ribbon G is installed at a fixed position in an upper portion of the stationary conveyor 13b in the transverse conveyance unit 4. A conveyance sheet ribbon S1 having stretchability and formed of resin foam is interposed between the wrinkle-smoothing unit 14 and the glass film ribbon G. The conveyance sheet ribbon S1 has a lower surface capable of sliding on the wrinkle-smoothing unit 14 and an upper surface serving as a conveyance support surface configured to convey and support the glass film ribbon G. Further, a cleaving unit 5 is arranged above a center portion of the conveyance path in the upper portion of the stationary conveyor 13b. The cleaving unit 5 is configured to cleave the unnecessary portion G1 including the thick selvage portion Gx to be formed in both end portions in a width direction (direction along the front and back surfaces and orthogonal to the conveyance direction) of the glass film ribbon G. That is, the stationary conveyor 13b comprises the cleaving unit 5 configured to cleave the unnecessary portion G1 of the glass film ribbon G on the conveyance path. Specifically, the cleaving unit 5 comprises a thermal stress cleaving device 5a comprising a laser light irradiator 5aa configured to locally heat a boundary between the unnecessary portion G1 of the glass film ribbon G and the thin effective portion G2 on the center side in the width direction thereof (preset cleaving line A extending in a longitudinal direction illustrated in FIG. 3), and a mist water jetting unit 5ab configured to cool a part heated by the laser light irradiator 5aa. Then, the cleaved unnecessary portion G1 (to be exact, the unnecessary portion G1 including the selvage portion Gx) is sent obliquely downward with respect to a front side in the conveyance direction and discarded.

The take-up unit 6 is arranged on a downstream side of the transverse conveyance unit 4. The take-up unit 6 is configured to take up the glass film ribbon G (effective portion G2), which is conveyed with the unnecessary portion G1 including the selvage portion Gx removed, into the glass roll R. A sheet roll r obtained by rolling a protective sheet S is arranged below the take-up unit 6, and the protective sheet S taken out from the sheet roll r is taken up so as to be laminated onto the glass film ribbon G (effective portion G2) by the take-up unit 6. Thus, the glass roll R is manufactured.

Figure 2:
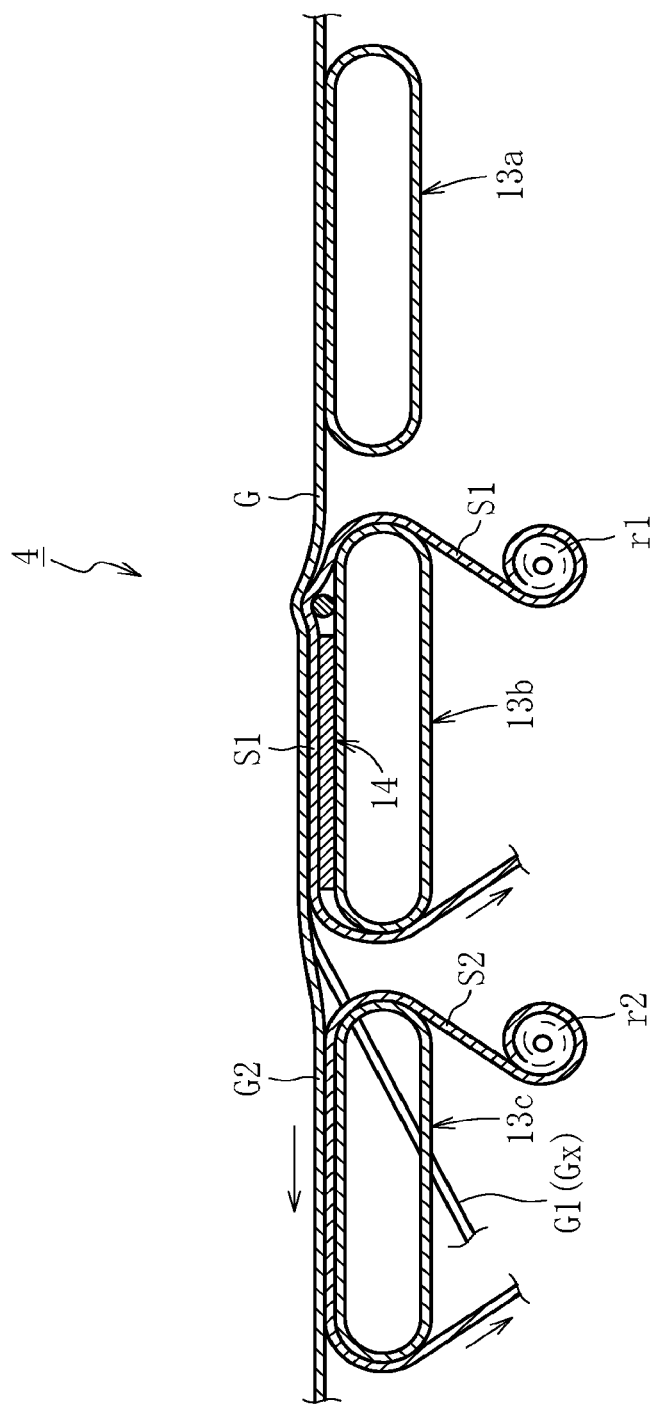
FIG. 2 is an enlarged vertical sectional side view for illustrating a main portion of the glass film ribbon manufacturing device according to the first embodiment of the present invention.

FIG. 2 is an enlarged vertical sectional side view for illustrating the configuration of the transverse conveyance unit 4 in detail. As illustrated in FIG. 2, the conveyance sheet ribbon S1 is taken out upward from a sheet roll r1 arranged below the stationary conveyor 13b and passes between the wrinkle-smoothing unit 14 and the glass film ribbon G in the upper portion of the stationary conveyor 13b to be sent downward from a downstream end portion of the stationary conveyor 13b. In this case, the conveyance sheet ribbon S1 is configured to be sent in an open loop shape (or in a closed loop shape although not shown) while sliding on the wrinkle-smoothing unit 14 by a drive unit (not shown). The resin foam forming the sheet ribbon S1 is made of a resin such as polyethylene or polypropylene having a foaming ratio of from 5 times to 100 times and a thickness of from 0.1 mm to 3.0 mm. With such configuration, the glass film ribbon G that has reached the transverse conveyance unit 4 via the direction changing unit 3 from the forming unit 2 is conveyed so as to be transferred from an upper surface portion of the first drive conveyor 13a to an upper surface portion of the conveyance sheet ribbon S1.

Further, a sheet ribbon S2 having stretchability and formed of a resin foam is rolled on an upper surface portion of the second drive conveyor 13c, and an upper surface of the sheet ribbon S2 serves as a conveyance support surface configured to convey and support the effective portion G2 of the glass film ribbon G after the unnecessary portion G1 including the selvage portion Gx is removed by cleaving. A sheet roll r2 obtained by rolling the sheet ribbon S2 is arranged below the second drive conveyor 13c. The sheet ribbon S2 taken out upward from the sheet roll r2 is rolled around an upper surface portion of a belt from an upstream end portion of the second drive conveyor 13c, and is sent downward from a downstream end portion of the second drive conveyor 13c. Thus, the sheet ribbon S2 is configured to be sent in an open loop shape (or in a closed loop shape although not shown) so as to follow the upper surface portion of the belt of the second drive conveyor 13c. Note that, the resin foam forming the sheet ribbon S2 is made of a resin such as polypropylene or polyethylene having a foaming ratio of 5 times to 100 times and a thickness of from 0.1 mm to 3.0 mm.

Figure 3:
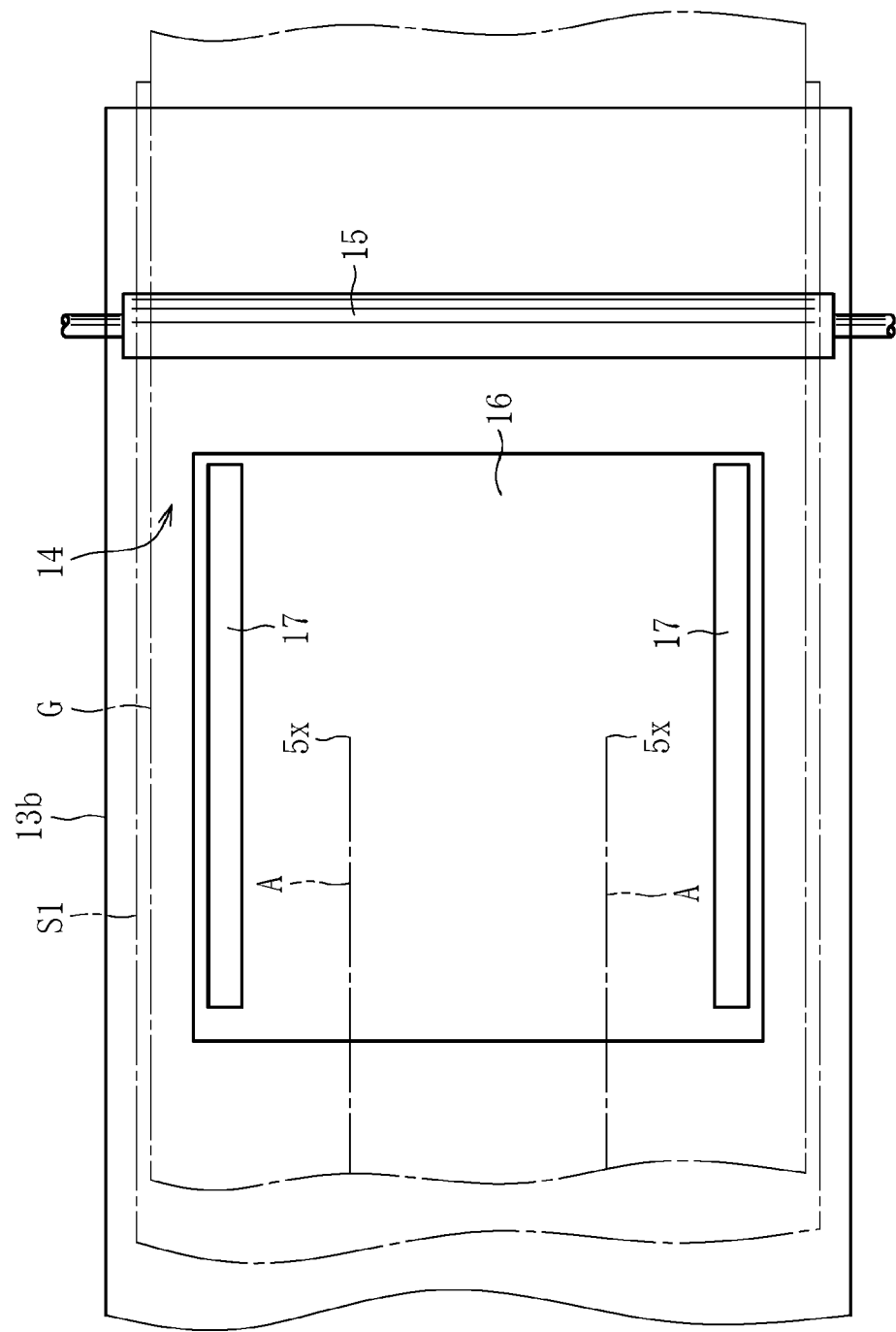
FIG. 3 is an enlarged plan view for illustrating the main portion of the glass film ribbon manufacturing device according to the first embodiment of the present invention.

FIG. 3 is a plan view for illustrating an entire configuration of the wrinkle-smoothing unit 14. As illustrated in FIG. 3, the wrinkle-smoothing unit 14 comprises an orthogonal rod-like body 15 arranged on an upstream side of a cleaving position 5x in the cleaving unit 5 for the glass film G so as to extend in a direction orthogonal to the conveyance direction, a bedplate 16 having a rectangular shape in plan view and arranged over a region from the upstream side to the downstream side of the cleaving position 5x, and a pair of parallel rod-like bodies 17 arranged in both end portions in a width direction (direction orthogonal to the conveyance direction) of the bedplate 16 so as to extend in a direction parallel to the conveyance direction. Note that, as can be understood from FIG. 3, both ends in the width direction of the conveyance sheet ribbon S1 extend off both the ends in the width direction of the glass film ribbon G, and both ends in the width direction of the stationary conveyor 13b extend off both ends in the width direction of the conveyance sheet ribbon S1. In this case, in the illustrated example, both ends in the longitudinal direction of the orthogonal rod-like body 15 extend off both the ends in the width direction of the glass film ribbon G, but on the contrary, both the ends in the width direction of the glass film ribbon G may extend off both the ends in the longitudinal direction of the orthogonal rod-like body 15. Further, in the illustrated example, both the ends in the width direction of the conveyance sheet ribbon S1 extend off both the ends in the width direction of the glass film ribbon G, but on the contrary, both the ends in the width direction of the glass film ribbon G may extend off both the ends in the width direction of the conveyance sheet ribbon S1.

Figure 4:
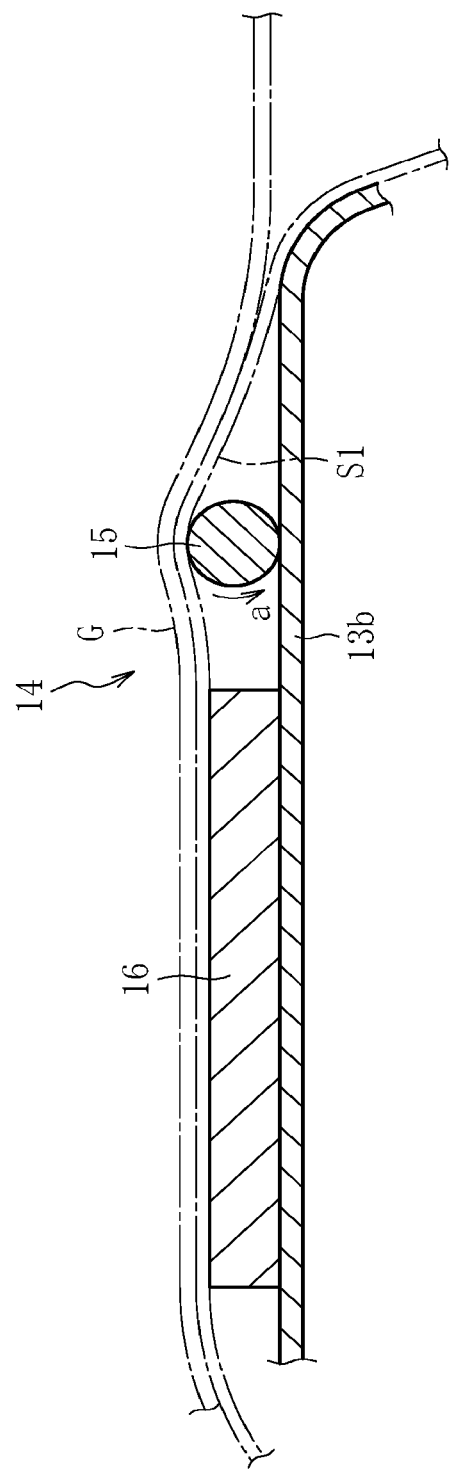
FIG. 4 is an enlarged vertical sectional side view for illustrating the main portion of the glass film ribbon manufacturing device according to the first embodiment of the present invention.

As illustrated in FIG. 4, the orthogonal rod-like body 15 forming the wrinkle-smoothing unit 14 is arranged in an upstream end portion of the stationary conveyor 13b, and the cross-section thereof orthogonal to the longitudinal direction forms a circular shape. In addition, the orthogonal rod-like body 15 is installed at a fixed position in an unrotatable state, for example, by being fixed onto the stationary conveyor 13b. Note that, the orthogonal rod-like body 15 may not be circular in cross-section, and may be, for example, oval or polygonal in cross-section. Alternatively, a lower surface portion of the orthogonal rod-like body 15 may be formed of a flat surface or the like. In any case, it is only necessary that a surface (upper surface) of the orthogonal rod-like body 15, which is brought into contact with a lower surface side of the glass film ribbon G, be curved in a convex shape or protruded. Further, in the case where the above-mentioned sectional shape is circular, the orthogonal rod-like body 15 may be configured to be driven to rotate in a direction of the arrow a (direction along the conveyance direction of the glass film ribbon G) in a state of being separated upward from an upper surface of the stationary conveyor 13b. In this case, the circumferential velocity of the orthogonal rod-like body 15 is set to be equal to or lower than the conveyance speed of the glass film ribbon G. Further, in such case, the orthogonal rod-like body 15 may be held so as to idly rotate.

Figure 5:
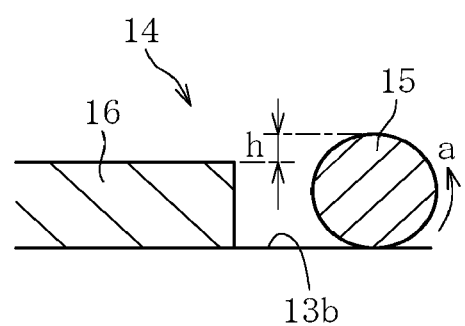
FIG. 5 is an enlarged vertical sectional side view for illustrating the main portion of the glass film ribbon manufacturing device according to the first embodiment of the present invention.

As illustrated in FIG. 5, an upper end position of the orthogonal rod-like body 15 is set to be higher than an upper end position of the bedplate 16, and a difference dimension h of the height thereof is set to from 1 mm to 10 mm, preferably from 1 mm to 3 mm. In this embodiment, the difference dimension h is set to 2 mm. In this case, the orthogonal rod-like body 15 and the bedplate 16 are separated in a close state, but it is only necessary that the separation distance thereof be set to such a degree that the glass film ribbon G is curved smoothly without being bent when being transferred from the orthogonal rod-like body 15 to the bedplate 16. Alternatively, the orthogonal rod-like body 15 and the bedplate 16 may be held in contact or substantially in contact with each other.

Figure 6:
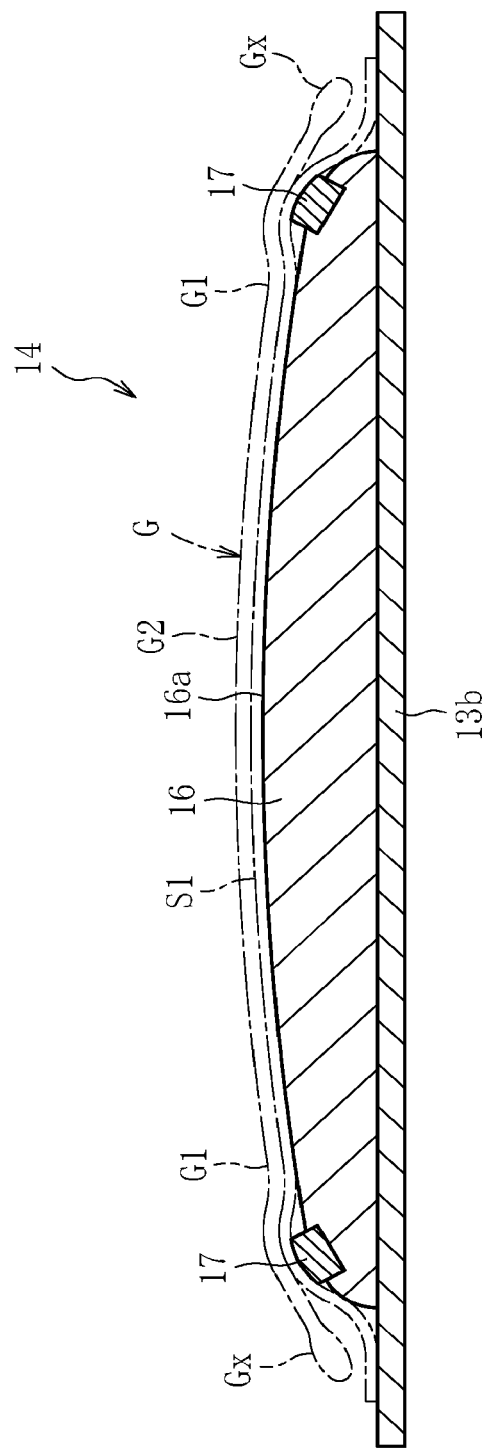
FIG. 6 is an enlarged vertical sectional front view for illustrating the main portion of the glass film ribbon manufacturing device according to the first embodiment of the present invention.

As illustrated in FIG. 6, the bedplate 16 forming the wrinkle-smoothing unit 14 is installed in a fixed manner on, for example, an upper surface portion of the stationary conveyor 13b, and an upper surface 16a thereof is gently curved so that a center portion in the width direction becomes higher than both end portions in the width direction. In this case, the illustrated sectional shape of the bedplate 16 may be, for example, a trapezoidal shape in which a center portion is flat and both end portions are inclined. The selvage portions Gx in both the end portions in the width direction of the glass film ribbon G are thicker than the effective portion G2, and the selvage portions Gx are each in a state of being floated while extending off both ends in the width direction of the upper surface of the bedplate 16. Specifically, the glass film ribbon G is supported from below with the upper surface of the bedplate 16 through intermediation of the conveyance sheet ribbon S1, and in this state, both end portions of the glass film ribbon G including the selvage portions Gx are floated above both end portions of the conveyance sheet ribbon S1 while extending off both the ends in the width direction of the bedplate 16.

The parallel rod-like bodies 17 forming the wrinkle-smoothing unit 14 are installed in a fixed manner on upper surface portions of the bedplate 16 at positions slightly closer to the center portion from both the ends in the width direction of the bedplate 16, and the upper end portions of the parallel rod-like bodies 17 each protrude upward from the upper surface of the bedplate 16. Further, a surface (upper surface) of each of the parallel rod-like bodies 17, which is brought into contact with a lower surface side of the glass film ribbon G, is curved in a convex shape, and a lower surface portion thereof is formed as a flat surface. However, the shape of a cross-section of the parallel rod-like body 17, which is orthogonal to the longitudinal direction, may be a circular shape, an oval shape, a square shape, or a rectangular shape. Note that, both ends in the longitudinal direction of the parallel rod-like body 17 are located at positions slightly closer to a center in the longitudinal direction from both corresponding ends of the bedplate 16.

With the above-mentioned configuration, the glass film ribbon G that has reached the transverse conveyance unit 4 via the direction changing unit 3 from the forming unit 2 illustrated in FIG. 1 is thin and has flexibility, and hence wrinkles are generated in a wider range while the glass film ribbon G is being conveyed in the transverse direction by the first drive conveyor 13a. However, the wrinkles generated in the upper surface portion of the first drive conveyor 13a are smoothed properly with the wrinkle-smoothing unit 14 arranged on a downstream side thereof, and are eliminated to such a degree as not to cause trouble in laser cleaving on the periphery of a cleaving region by the cleaving unit 5.

Figure 7:
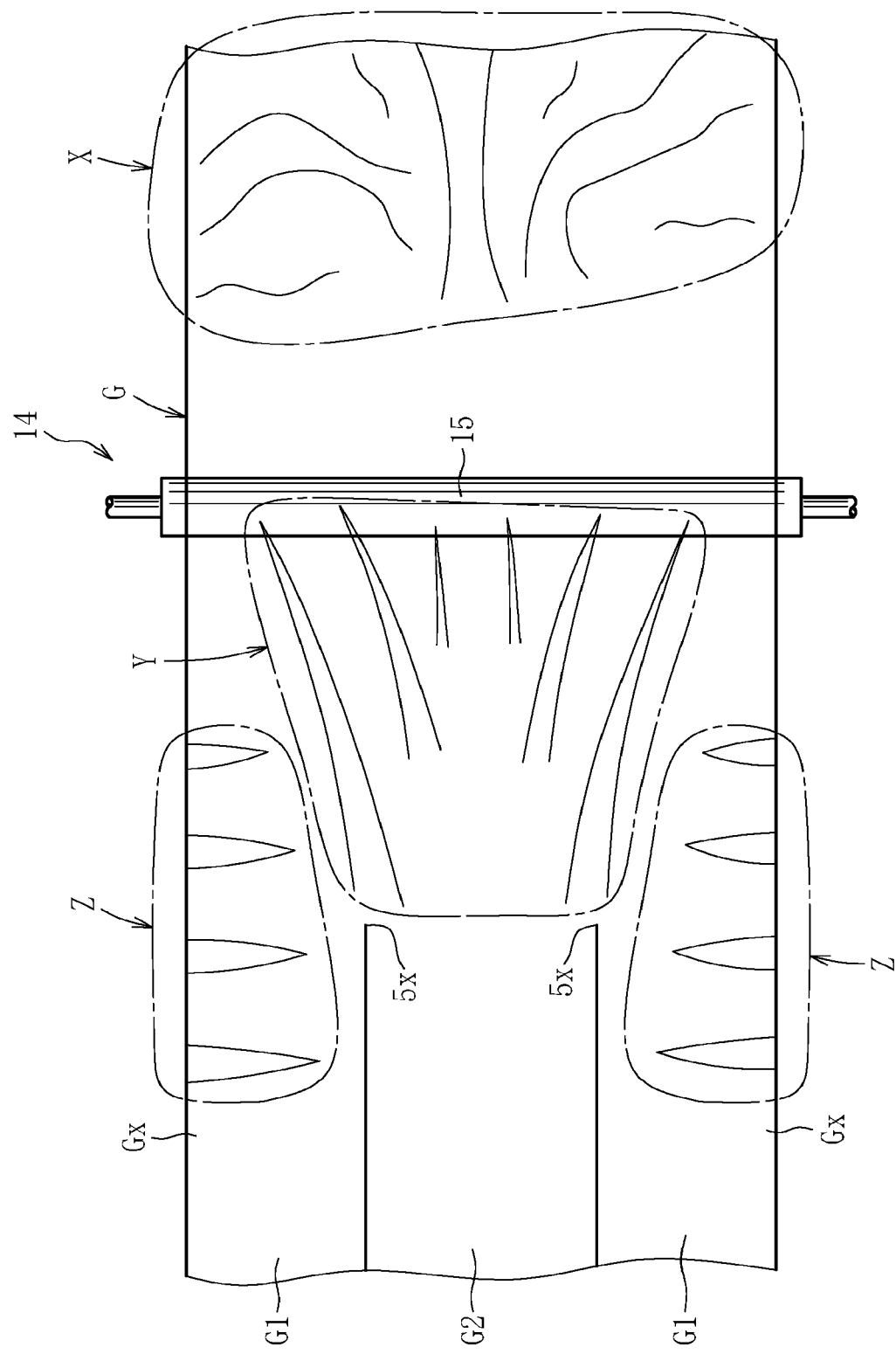
FIG. 7 is an enlarged plan view for illustrating an action of the glass film ribbon manufacturing device according to the first embodiment of the present invention.

FIG. 7 is a schematic plan view for illustrating the action and effect of only the orthogonal rod-like body 15 being a component of the wrinkle-smoothing unit 14, and for convenience, the conveyance sheet ribbon and each conveyor are not shown. As illustrated in FIG. 7, in the upper surface portion of the first drive conveyor 13a, irregular wrinkles having various directivities as denoted by the reference symbol X are generated in an entire region in the width direction of the glass fil ribbon G. In the case where the glass film ribbon G runs on the orthogonal rod-like body 15 after reaching the upper surface portion of the stationary conveyor 13b, in a downstream part of the orthogonal rod-like body 15, wrinkles along the conveyance direction as denoted by the reference symbol Y are generated in the center portion in the width direction, and wrinkles along a direction orthogonal to the conveyance direction as denoted by the reference symbol Z are generated in both the end portions in the width direction. That is, the irregular wrinkles generated in the entire region in the width direction as denoted by the reference symbol X are converted into partially regular wrinkles as denoted by the reference symbols Y and Z when the orthogonal rod-like body 15 lifts up the glass film ribbon G. Thus, even with only the orthogonal rod-like body 15, the adverse effect of the wrinkles on laser cleaving at the cleaving position 5x is alleviated. Note that, the wrinkles as denoted by the reference symbol Z are generated in both the end portions in the width direction owing to the presence of unevenness in the conveyance direction because the thickness of the selvage portions Gx located in both the end portions in the width direction of the glass film ribbon G are varied.

Figure 8:
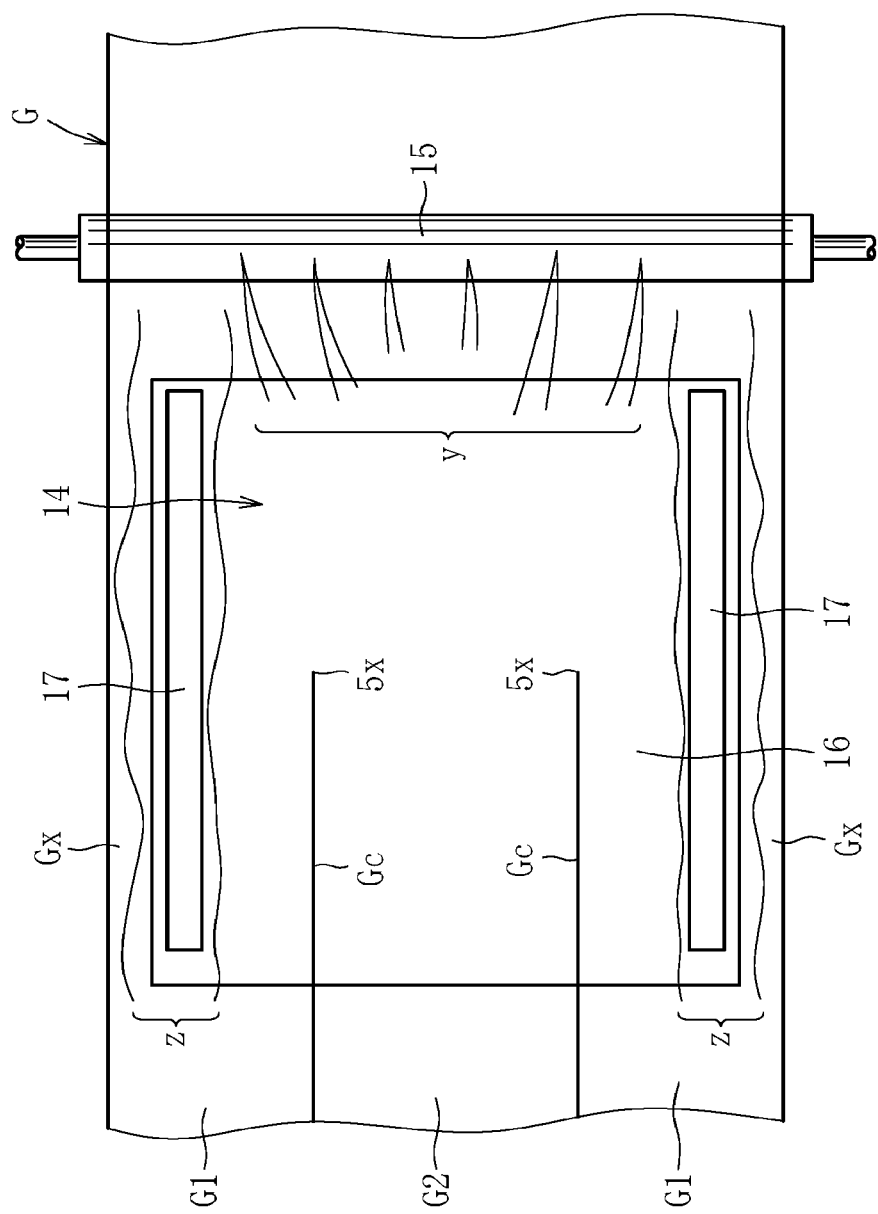
FIG. 8 is an enlarged plan view for illustrating the action of the glass film ribbon manufacturing device according to the first embodiment of the present invention.
Figure 9:
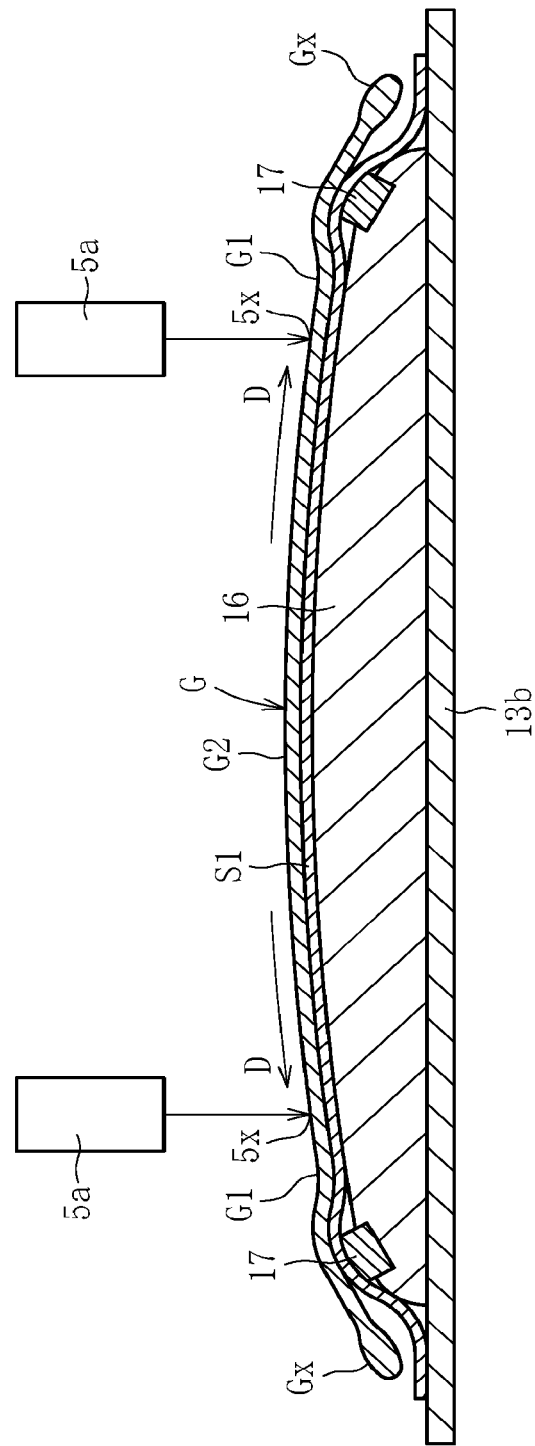
FIG. 9 is an enlarged vertical sectional front view for illustrating the action of the glass film ribbon manufacturing device according to the first embodiment of the present invention.

FIG. 8 is a schematic plan view for illustrating the action and effect in the case where the bedplate 16 and the pair of parallel rod-like bodies 17 is arranged in addition to the orthogonal rod-like body 15 as the wrinkle-smoothing unit 14, and for convenience, the conveyance sheet ribbon and each conveyor are not shown. As illustrated in FIG. 8, in the case where the glass film ribbon G runs on the orthogonal rod-like body 15 and then runs on the bedplate 16 and the pair of parallel rod-like bodies 17, the wrinkles along the conveyance direction as denoted by the reference symbol Y described above become extremely short wrinkles at this time as denoted by the reference symbol y, and the wrinkles along the direction orthogonal to the conveyance direction as denoted by the reference symbol Z described above are converted into wrinkles in a region having an extremely narrow width in both the end portions in the width direction at this time as denoted by the reference symbol z. The first reason for the occurrence of such phenomenon resides in that, as illustrated in FIG. 9, both the end portions in the width direction including the selvage portions Gx of the glass film ribbon G are floated while extending off both the ends in the width direction of the bedplate 16 (or the pair of parallel rod-like bodies 17), and hence the glass film ribbon G is not influenced by the unevenness in the selvage portions Gx described above. Further, the second reason resides in that, due to the synergistic effect obtained by the fact that the selvage portions Gx are floated while extending off both the ends in the width direction of the bedplate 16 as described above and the fact that the center portion in the width direction of the upper surface of the bedplate 16 is higher than both the end portions in the width direction thereof, a tensile force directed to outer sides in the width direction as indicated by the arrow D is generated in the glass film ribbon G. Further, the third reason resides in that the wrinkles generated along the conveyance direction are pulled into the vicinity of the parallel rod-like bodies 17 when the parallel rod-like bodies 17 lift up both the end portions in the width direction of the glass film ribbon G. Thus, at the cleaving position 5x illustrated in FIG. 8, a cleaving part Gc propagates linearly almost without being influenced by the wrinkles. As a result, the cleaving end surface of the glass film ribbon G3 after cleaving has proper properties.

Further, the bedplate 16 and the parallel rod-like bodies 17 are arranged over the region from the upstream side to the downstream side of the cleaving position 5x, and hence even after cleaving, the lift-up force still acts on the cleaving parts Gc or the tensile force directed to both the end sides in the width direction still acts on the unnecessary portions G1 including the selvage portions Gx. Therefore, the opposing cleaving end surfaces in the cleaving parts Gc are to be separated from each other. Accordingly, the occurrence of damages and cracks caused by the contact between the opposing cleaving end surfaces in the cleaving parts Gc is avoided effectively, with the result that the cleaving end surfaces having proper properties can be ensured.

Figure 10:
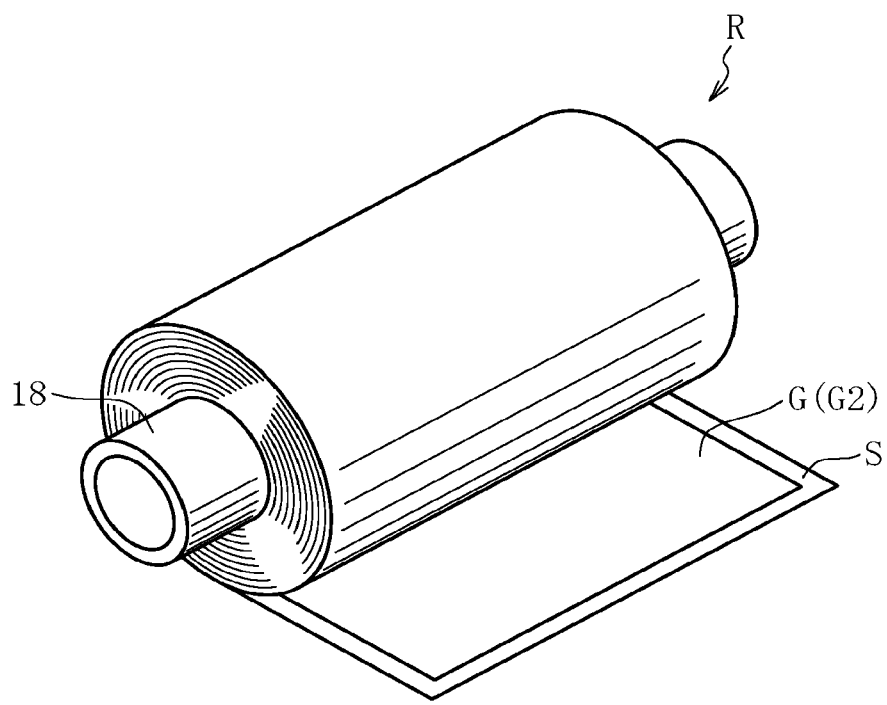
FIG. 10 is a schematic perspective view of a glass roll manufactured through use of the glass film ribbon manufacturing device according to the first embodiment of the present invention.

The glass film ribbon G that has been cleaved as described above reaches the take-up unit 6 in a state in which the wrinkles have been eliminated, with the result that the glass roll R can be finally obtained by rolling the glass film ribbon (effective portion G2) and the protective sheet S around a roll core 18 in a state of being laminated as illustrated in FIG. 10. The glass roll R thus obtained has high quality with extremely small rolling displacement, few scars of the end surfaces, and the like.

Figure 11:
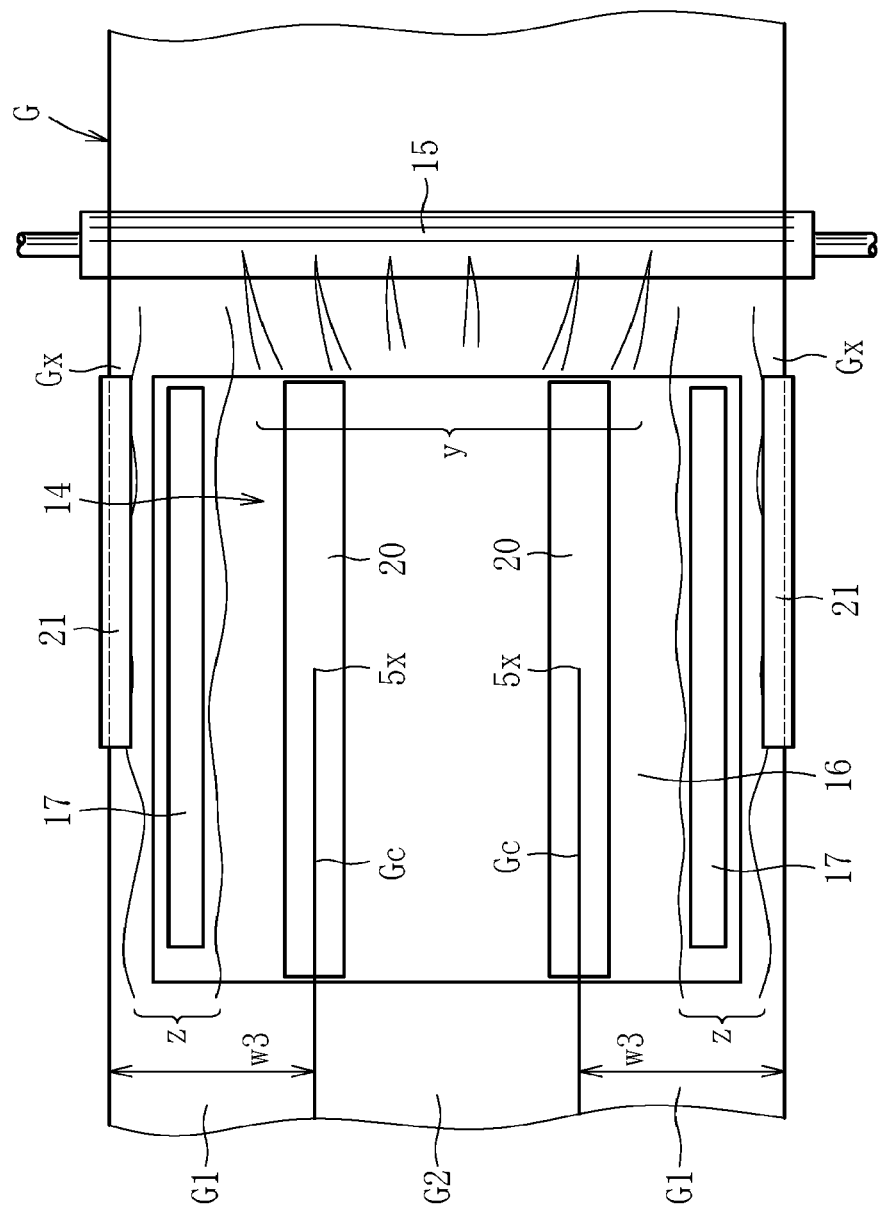
FIG. 11 is an enlarged plan view for illustrating a main portion of a glass film ribbon manufacturing device according to a second embodiment of the present invention.
Figure 12:
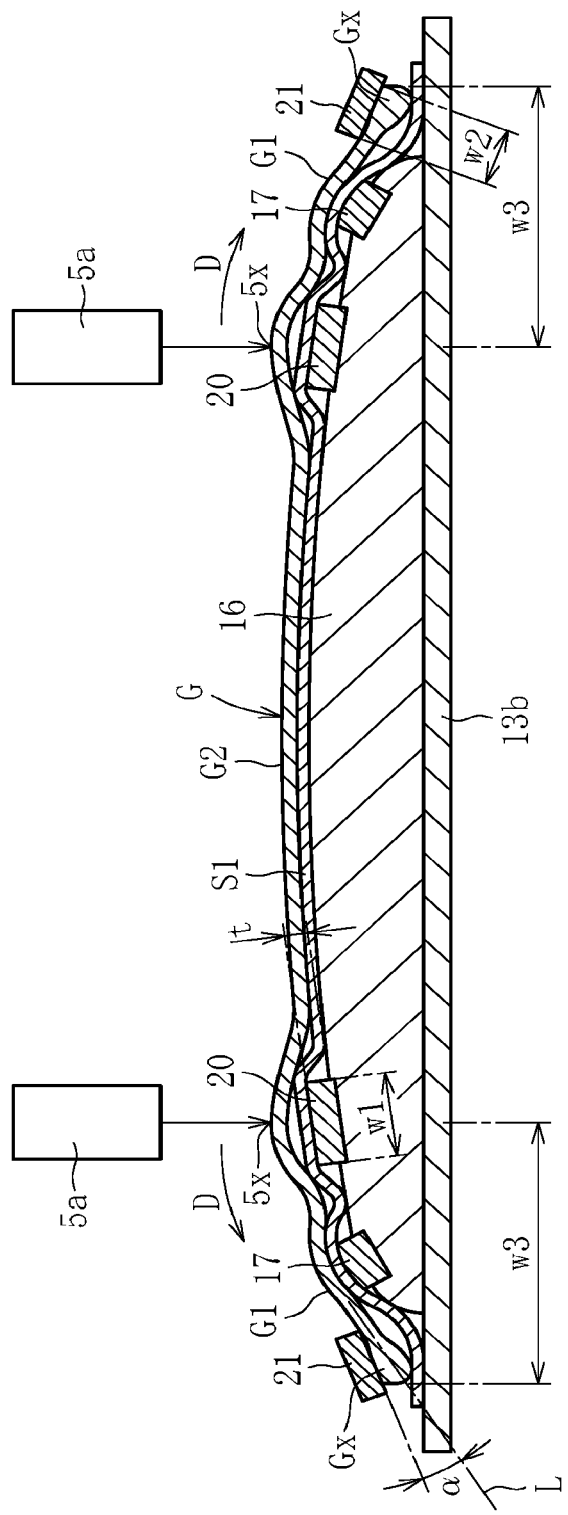
FIG. 12 is an enlarged vertical sectional front view for illustrating the main portion of the glass film ribbon manufacturing device according to the second embodiment of the present invention.

FIG. 11 is a plan view for illustrating a configuration of a main portion of a manufacturing device 1 according to a second embodiment of the present invention. FIG. 12 is a vertical sectional front view for similarly illustrating the configuration of the main portion of the manufacturing device 1. As illustrated in each of FIG. 11 and FIG. 12, the manufacturing device 1 according to the second embodiment is different from the manufacturing device 1 according to the first embodiment described above in that a pair of raising bodies 20, which is arranged in a region including the cleaving position 5x and extending from the cleaving position 5x to each of an upstream side and a downstream side in the direction parallel to the conveyance direction, is added as a component of the wrinkle-smoothing unit 14, and in that a pair of holding bodies 21 configured to hold the selvage portions Gx in both the end portions in the width direction of the glass film ribbon G from above is added. The other components are the same as those of the first embodiment described above. Therefore, in the following description, the components common to both the embodiments are denoted by the same reference symbols, and the descriptions thereof are omitted.

The raising body 20 is installed in a fixed manner on an upper surface portion of the bedplate 16 and protrudes upward from the upper surface of the bedplate 16, and the position in the width direction at which the raising body 20 is installed is defined as the position including the cleaving part Gc and the cleaving position 5x of the glass film ribbon G. Further, the length along the conveyance direction of the raising body 20 is set to be equal or substantially equal to the length along the conveyance direction of the bedplate 16.

Herein, the cleaving position 5x illustrated in FIG. 11 is also a position at which the glass film ribbon G is actually cleaved, specifically, a position to be set as a leading end when the glass film ribbon G is cleaved.

The above-mentioned configuration is described in detail. A protrusion height t of the raising body 20 from the upper surface of the bedplate 16 falls preferably within a range of from {[0.05/thickness of glass film ribbon G (mm)] (mm)} to {[1.00/thickness of glass film ribbon G (mm)] (mm)}, more preferably within a range of from {[0.10/thickness of glass film ribbon G (mm)] (mm)} to {[0.75/thickness of glass film ribbon G (mm)] (mm)}. When the protrusion height t is excessively large, the bending stress acting on the glass film ribbon G from the raising body 20 becomes larger, and cracks, which occur along the bending stress from the cleaving position 5x of the glass film ribbon G as an origin, propagate toward an upstream side, with the result that laser cleaving may not be performed. On the other hand, when the protrusion height t is excessively small, the lift-up amount of the glass film ribbon G by the raising body 20 becomes insufficient, and the effect of smoothing wrinkles in particular in the glass film ribbon G having small thickness (for example, having a thickness of 40 µm or less) may not be obtained sufficiently. Thus, when the protrusion height t falls within the above-mentioned range, those troubles may be avoided.

Figure 13:
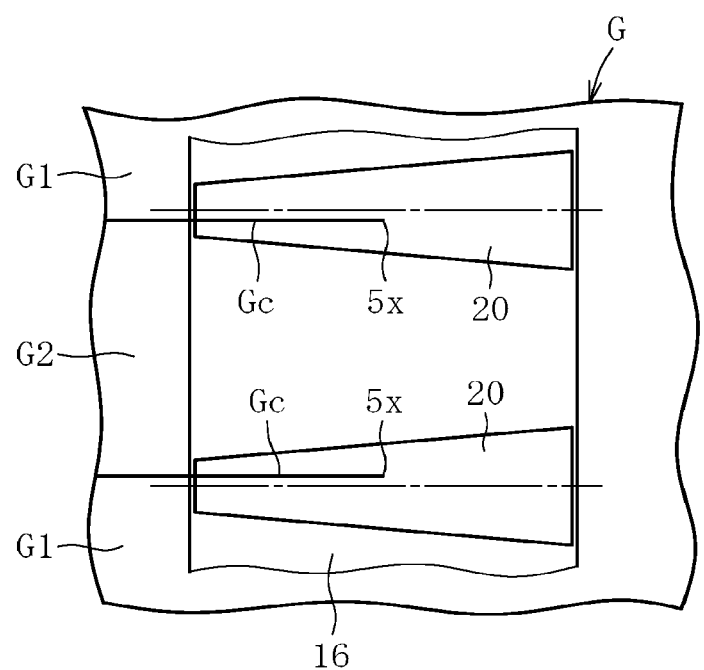
FIG. 13 is an enlarged plan view for illustrating a main portion of a modified example of the glass film ribbon manufacturing device according to the second embodiment of the present invention.

A width w1 of the raising body 20 falls preferably within a range of 500 times to 10,000 times, more preferably within a range of from 1,000 times to 5,000 times of the thickness of the glass film ribbon G. When the width w1 is excessively large, the raising body 20 lifts up a large region of the glass film ribbon G, and hence it becomes difficult to allow the glass film ribbon G to have sufficient tension, with the result that the effect of the lift-up may not be obtained. On the other hand, when the width w1 is excessively small, a region of the glass film ribbon G lifted up by the raising body 20 becomes insufficient, and it becomes difficult to allow the glass film ribbon G to have sufficient tension, with the result that the effect of the lift-up may not be obtained even in this case. Thus, when the width w1 falls within the above-mentioned range, those troubles may be avoided. In this case, the width of the raising body 20 may be constant over the region from the upstream side to the downstream side of the cleaving position 5x. However, for example, as illustrated in FIG. 13, the width may become gradually smaller as approaching from the upstream side to the downstream side, or a part having a constant width on the downstream side may be narrower than a part having a constant width on the upstream side, with the cleaving position 5x being a boundary. Further, although the raising body 20 may have the cleaving position 5x located at the center in the width direction, the center in the width direction may be offset from the cleaving position 5x, and in this case, it is preferred that the center in the width direction be offset from the cleaving position 5x to the outer side in the width direction.

The length of the raising body 20 is preferably 100 mm or more, more preferably 200 mm or more from the cleaving position 5x to the upstream side. Further, the length of the raising body 20 is preferably 100 mm or more, more preferably 200 mm or more from the cleaving position 5x to the downstream side. When the length of the raising body 20 is excessively small in any of the upstream part and the downstream part of the cleaving position 5x, the effect of smoothing wrinkles generated in the glass film ribbon G may not be obtained sufficiently.

Note that, although the shape of a cross-section of the raising body 20, which is orthogonal to the longitudinal direction, may be a rectangular shape as in an example illustrated in FIG. 12, the shape may be a circular shape, an oval shape, a square shape, or the like. In any case, it is only necessary that the raising body 20 lift up the glass film ribbon G upward in a convex curved shape.

Meanwhile, the holding bodies 21 extend in the direction parallel to the conveyance direction at positions in the width direction at which the selvage portions Gx are located in both the end portions in the width direction of the glass film ribbon G. The holding bodies 21 are suspended and supported by a portal support pillar fixed on a floor surface, the stationary conveyor 13b, or the like to be installed at fixed positions and arranged over the region from the upstream side to the downstream side of the cleaving positions 5x.

The role of the holding body 21 is as follows. That is, in general, in the selvage portion Gx in each of both the end portions in the width direction of the glass film ribbon G, parts that are to be convex upward and parts that are to be convex downward are repeatedly formed adjacently in the longitudinal direction during transverse conveyance, and the following situation has occurred frequently. Along with the conveyance, the parts that are convex upward are inverted to parts that are convex downward, and the parts that are convex downward are inverted to the parts that are convex upward. When such situation occurs, vibration occurs in the selvage portion Gx of the glass film ribbon G, and the vibration propagates to the cleaving position 5x. Therefore, the cleaving is inevitably stopped. However, when the holding body 21 is arranged, the holding body 21 holds from above the selvage portion Gx of the glass film ribbon G, and thus the transverse conveyance can be performed in a state in which the parts that are convex upward and the parts that are convex downward are prevented from being inverted. Accordingly, the phenomenon in which the parts that are to be convex upward and the parts that are to be convex downward are inverted may not occur, and along with this, the occurrence of the vibration is suppressed, with the result that laser cleaving is performed smoothly and satisfactorily.

A dimension w2 of the width of a lower surface of the holding body 21, which is held in contact with an upper surface of the selvage portion Gx of the glass film ribbon G (hereinafter referred to as "holding width"), falls preferably within a range of from 0.01 time to 0.5 time, more preferably within a range of from 0.05 time to 0.25 time of a dimension w3 from the cleaving position 5x of the glass film ribbon G to the outer end in the width direction of the selvage portion Gx. When the holding width is excessively small, a region of the lower surface of the holding body 21, which is brought into contact with the selvage portion Gx, becomes insufficient, and hence the effect of suppressing the vibration of the selvage portion Gx may not be obtained sufficiently. On the other hand, when the holding width is excessively large, a stress generated by the holding body 21 holding the selvage portion Gx is applied to the cleaving position 5x of the glass film ribbon G, and hence the cleaving is prevented from propagating straight, which may become a factor for stopping the cleaving. Accordingly, when the dimension w2 of the holding width falls within the above-mentioned range, those troubles may be avoided.

The length of the holding body 21 is preferably 100 mm or more, more preferably 200 mm or more from the cleaving position 5x to the upstream side, and further, the length of the holding body 21 is preferably 100 mm or more, more preferably 200 mm or more from the cleaving position 5x to the downstream side. When the length of the holding body 21 is excessively small in any of the upstream part and the downstream part of the cleaving position 5x, the effect of suppressing the vibration of the selvage portion Gx becomes insufficient. Note that, as in the example illustrated in FIG. 11, the length of the holding body 21 in the upstream part of the cleaving position 5x may be larger than that in the downstream part.

It is preferred that the lower surface of the holding body 21 be inclined along a direction in which the selvage portion Gx of the glass film ribbon G hangs down, and that an angle α of the lower surface of the holding body 21 fall within ±20° with reference to a hang-down line L of the selvage portion Gx illustrated in FIG. 12. When the inclination angle of the lower surface of the holding body 21 from a horizontal surface is excessively large, a force of pressing the selvage portion Gx of the glass film ribbon G downward tends to become insufficient, and hence the effect of suppressing the vibration of the selvage portion Gx becomes insufficient. On the other hand, when the inclination angle of the lower surface of the holding body 21 from the horizontal surface is excessively small, a stress is concentrated on an inner side in the width direction of a contact portion of the lower surface of the holding body 21, which is held in contact with the upper surface of the selvage portion Gx, with the result that cracks are liable to occur in the glass film ribbon G. Thus, when the inclination angle of the lower surface of the holding body 21 falls within the above-mentioned range, those troubles may be avoided.

In the case where the shape of the holding body 21 is a plate shape as in the example illustrated in FIG. 11 and FIG. 12, the lower surface of the holding body 21 is preferably flat, and the material therefor is preferably a resin, such as polyethylene, polypropylene, or Teflon (trademark) having small friction resistance against the glass film ribbon G. Further, the holding body 21 is not limited to the holding body having a plate shape and may be a multiple roller (the material is preferably the same resin as described above) capable of rolling on the upper surface of the selvage portion Gx in the longitudinal direction, or the like.

As described above, in the manufacturing device 1 according to the second embodiment, the glass film ribbon G is lifted up on the periphery of the cleaving position 5x by additionally arranging the raising body 20. Therefore, in particular, the glass film ribbon G having small thickness is allowed to have tension at a part in which wrinkles are liable to be generated, and the sufficient effect of smoothing the wrinkles can be obtained. Incidentally, the manufacturing device 1 according to the first embodiment described above is suitable for smoothing wrinkles in the glass film ribbon G having a thickness of 50 μm or more, whereas the manufacturing device 1 according to the second embodiment is suitable for smoothing wrinkles in the glass film ribbon G having a thickness of less than 50 μm, in particular, a thickness of 40 μm or less or 30 μm or less. Further, in the manufacturing device 1 according to the second embodiment, the holding body 21 is additionally arranged. Therefore, the factor for stopping cleaving, in which vibration occurs in the selvage portion Gx of the glass film ribbon G, and the vibration propagates to the cleaving position 5x, is eliminated, with the result that smooth cleaving can be performed.

Figure 14:
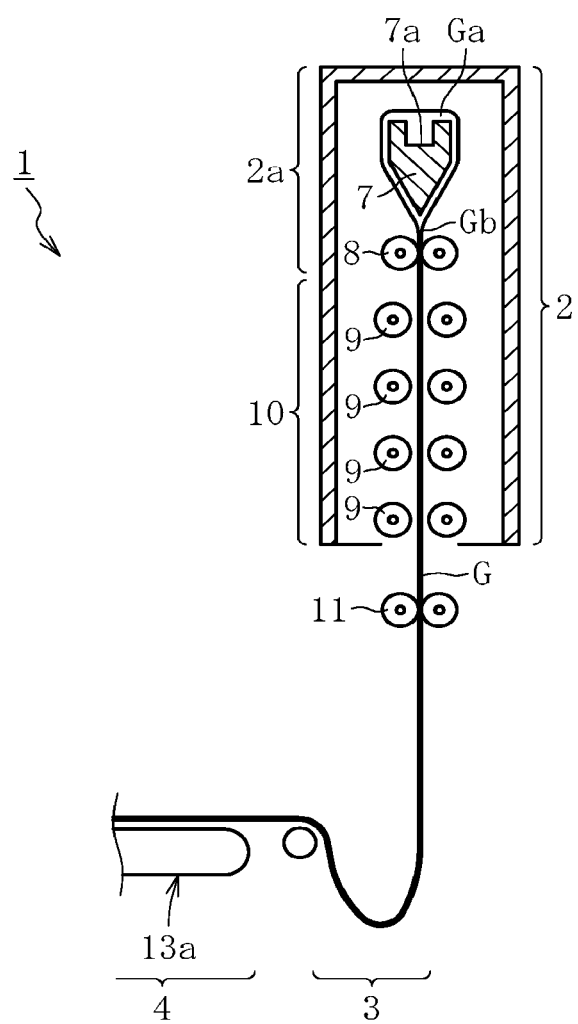
FIG. 14 is a schematic side view for illustrating a configuration of a main portion of a glass film ribbon manufacturing device according to a third embodiment of the present invention.

FIG. 14 is a schematic side view for schematically illustrating an entire configuration of a manufacturing device 1 according to a third embodiment of the present invention. In the manufacturing device 1 according to the first embodiment described above, the moving path of the glass film ribbon G from the direction changing unit 3 to the transverse conveyance unit 4 is not positioned below the moving path of the glass film ribbon G in the transverse conveyance unit 4. However, the manufacturing device 1 according to the third embodiment is constructed such that the glass film ribbon G drawn vertically downward from the forming unit 2 follows the following moving path. In the direction changing unit 3, the glass film ribbon G hangs down below the moving path in the transverse conveyance unit 4 and shifts upward to reach the transverse conveyance unit 4. The other configurations are the same as those of the manufacturing device 1 according to the first embodiment described above. Therefore, the detailed illustration is omitted, and in the illustrated configurations, the common components are denoted by the same reference symbols, and the descriptions thereof are omitted.

Figure 15:
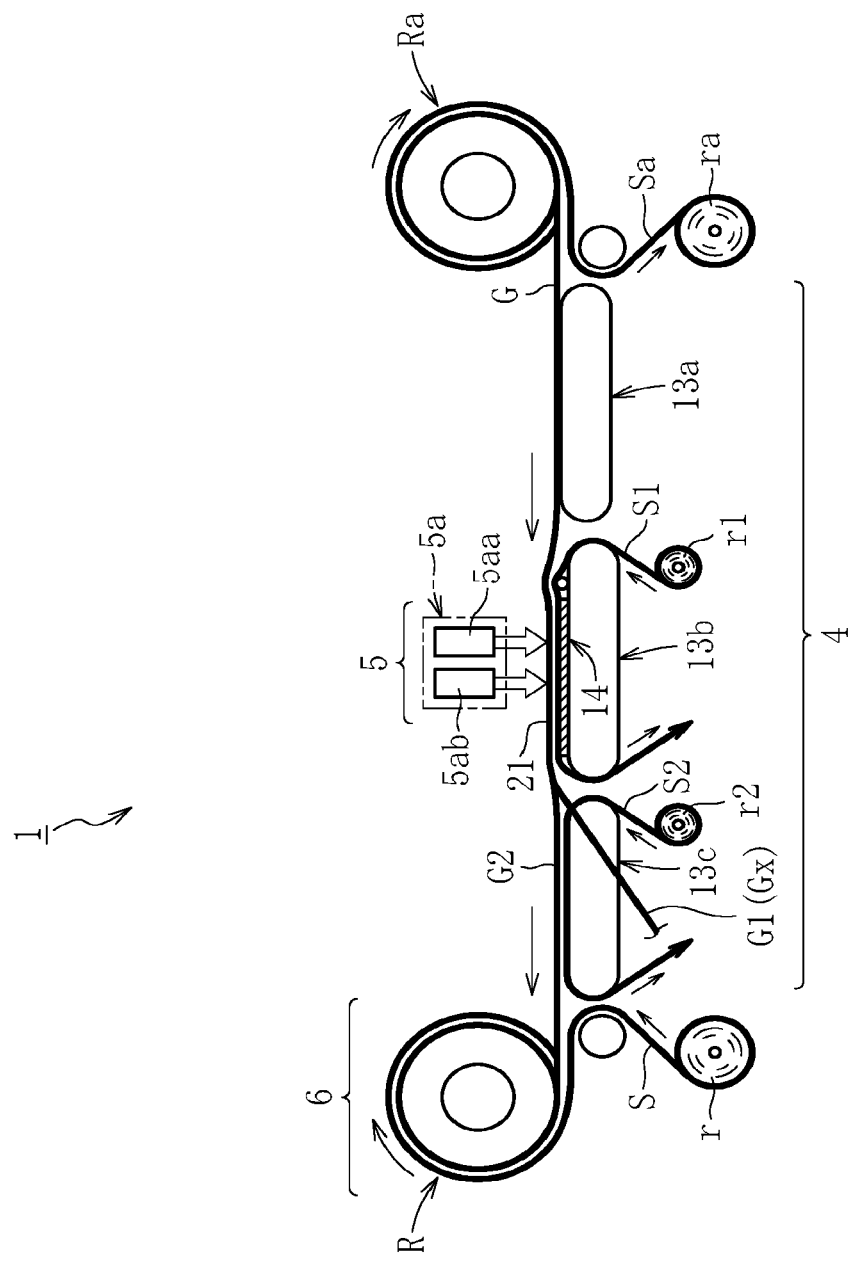
FIG. 15 is a schematic side view for illustrating an entire configuration of a glass film ribbon manufacturing device according to a fourth embodiment of the present invention.

FIG. 15 is a schematic side view for schematically illustrating an entire configuration of a manufacturing device 1 according to a fourth embodiment of the present invention. As illustrated in FIG. 15, the manufacturing device 1 is used for carrying out a roll-to-roll process, and takes out the glass film ribbon G from one glass roll Ra (right side of FIG. 5) and takes up the glass film ribbon G into the other glass roll R (left side of FIG. 5). The transverse conveyance unit 4 configured to convey the glass film ribbon G in the transverse direction is provided on a downstream side of the one glass roll Ra and on an upstream side of the other glass roll R. The manufacturing device 1 according to the fourth embodiment is the same as the manufacturing device 1 according to the first and second embodiment described above in that the wrinkle-smoothing unit 14 and the holding bodies 21 are arranged in the transverse conveyance unit 4, and in the configuration of the wrinkle-smoothing unit 14 and the holding bodies 21, the positional relationship between each of the wrinkle-smoothing unit 14 and the holding bodies 21 and the cleaving portions 5, and the like. That is, the manufacturing device 1 according to the fourth embodiment is different from the manufacturing device 1 according to the first embodiment described above in that the glass film ribbon G taken out from the one glass roll Ra is sent to the transverse conveyance unit 4, and along with this, a protective sheet Sa taken out from the one glass roll Ra is taken up into a sheet roll ra. The other configurations are the same as those of the manufacturing device 1 according to the first embodiment described above. Therefore, the components common to both the embodiments are denoted by the same reference symbols, and the descriptions thereof are omitted. In the manufacturing device 1, the one glass roll Ra is obtained by taking up the glass film ribbon G including the selvage portion Gx, and the unnecessary portion G1 including the selvage portion Gx is removed with the cleaving unit 5. Note that, the one glass roll Ra may be obtained by taking up the glass film ribbon from which the selvage portion Gx has been removed by cleaving, and in this case, the glass film ribbon G is cleaved by the cleaving unit 5 along one or a plurality of preset cleaving lines extending in the longitudinal direction.

Note that, in the first to fourth embodiments described above, the wrinkle-smoothing unit 14 comprises the orthogonal rod-like body 15, the bedplate 16, the parallel rod-like body 17, and the raising body 20. However, the wrinkle-smoothing unit 14 may comprise only the orthogonal rod-like body 15, only the bedplate 16, or only the parallel rod-like body 17. Alternatively, the wrinkle-smoothing unit 14 may comprise only the raising body 20. Note that, in the case where the wrinkle-smoothing unit 14 comprises only the bedplate 16, only the parallel rod-like body 17, or only the raising body 20, it is preferred that the sliding resistance of the wrinkle-smoothing unit 14 against the lower surface of the conveyance sheet ribbon S1 be decreased by setting an upstream end surface of the bedplate 16, an upstream end surface of the parallel rod-like body 17, or an upstream end surface of the raising body 20 to an inclined surface or a convex curved surface that becomes gradually higher as approaching to the downstream side, with the upstream side being lowered.

Further, in the first to fourth embodiments described above, the wrinkle-smoothing unit 14 and the holding body 21 are arranged on the stationary conveyor 13b in the transverse conveyance unit 4. However, the wrinkle-smoothing unit 14 and the holding body 21 may be arranged in an upper portion of a base portion installed in a fixed manner in a without using the stationary conveyor 13b.

Further, in the first to fourth embodiments described above, the conveyance sheet ribbon S1 is interposed between the glass film ribbon G and the wrinkle-smoothing unit 14. However, the glass film ribbon G may be slid on an upper surface portion of the wrinkle-smoothing unit 14 without using the conveyance sheet ribbon S1. Note that, in this case, it is necessary to prevent each component of the wrinkle-smoothing unit 14 from causing unacceptable scars and the like on a lower surface of the glass film ribbon G.

Further, in the first to fourth embodiments described above, two drive conveyors are used as components of the transverse conveyance unit 4. However, instead of this, one drive conveyor may be used as a component of the transverse conveyance unit 4. Note that, in this case, it is necessary to install the wrinkle-smoothing unit 14 and the holding body 21 at fixed positions in a state of being isolated from the drive conveyor. Note that, three or more drive conveyors may be used as components of the transverse conveyance unit 4.

Figure 16:
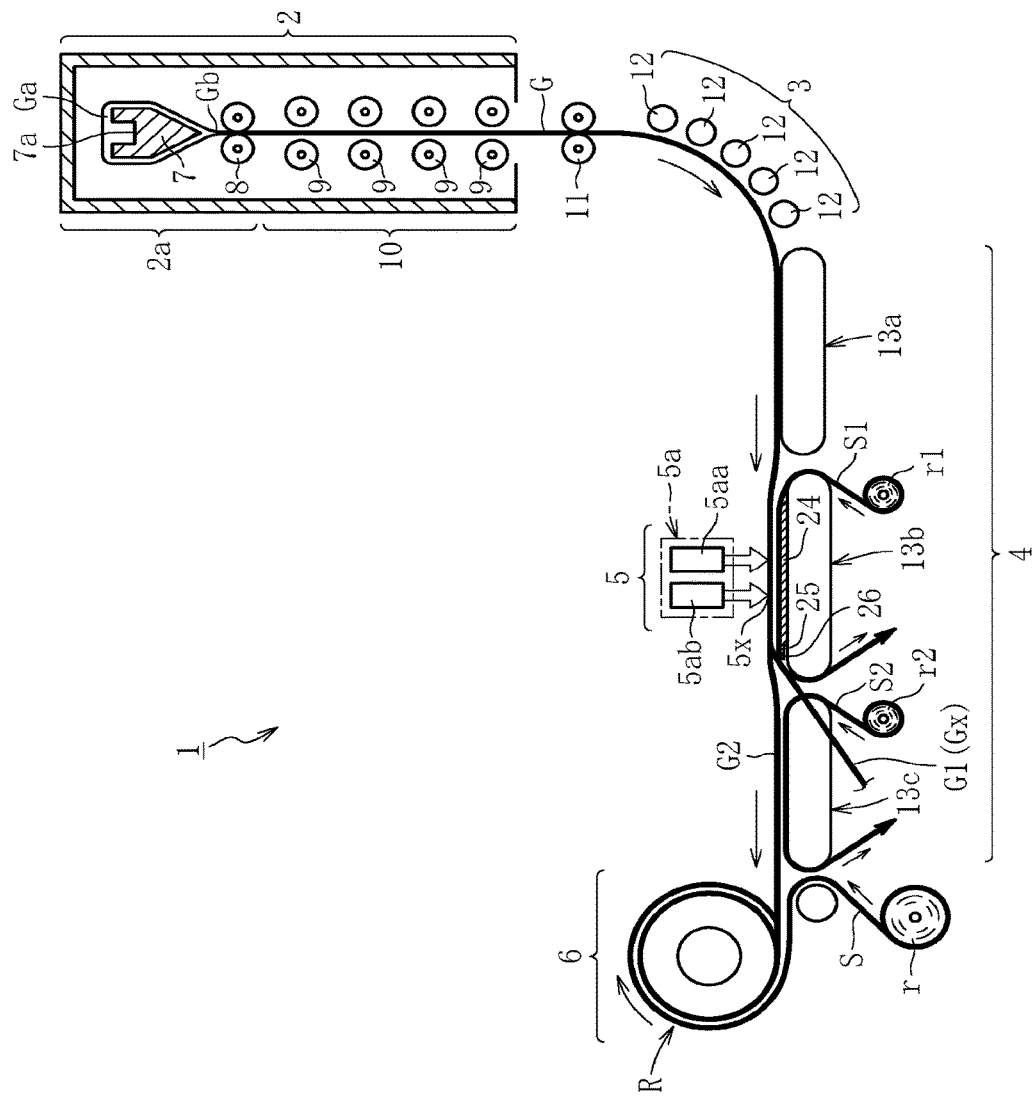
FIG. 16 is a schematic side view for illustrating an entire configuration of a glass film ribbon manufacturing device according to a fifth embodiment of the present invention.
Figure 17:
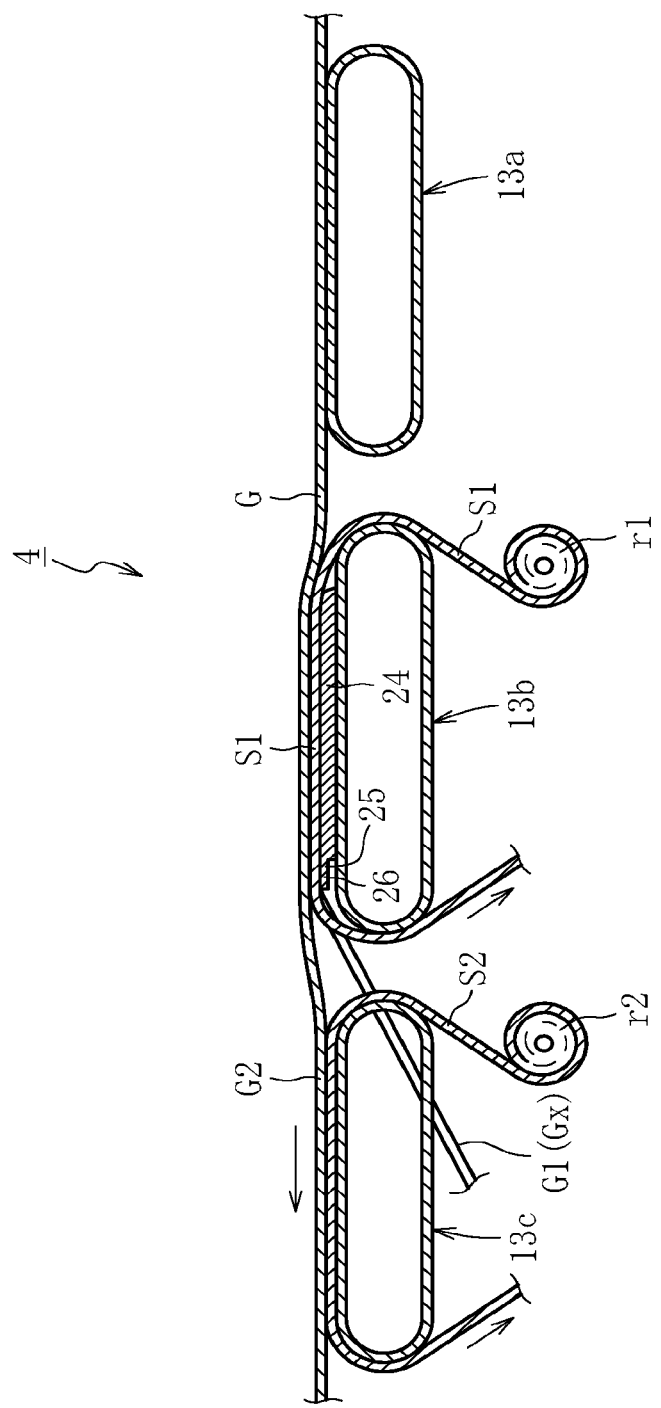
FIG. 17 is an enlarged vertical sectional side view for illustrating a main portion of the glass film ribbon manufacturing device according to the fifth embodiment of the present invention.

FIG. 16 is a schematic side view for schematically illustrating an entire configuration of a manufacturing device 1 according to a fifth embodiment of the present invention. FIG. 17 is an enlarged vertical sectional side view for illustrating a configuration of the transverse conveyance unit 4 of the manufacturing device 1 in detail. The manufacturing device 1 according to the fifth embodiment is different from the manufacturing device 1 according to the first embodiment described above in that a surface plate 24, an unnecessary portion supporting part 25, and an effective portion supporting part 26 are arranged in the upper portion of the stationary conveyor 13b in the transverse conveyance unit 4 in place of the wrinkle-smoothing unit 14. Thus, in FIG. 16 and FIG. 17, the components common to those of the manufacturing device 1 according to the first embodiment described above are denoted by the same reference symbols, and the descriptions thereof are omitted. In this case, the bedplate 16 serving as a component of the wrinkle-smoothing unit 14 in the first embodiment described above is considered as the surface plate 24 in this embodiment, and the unnecessary portion supporting part 25 and the effective portion supporting part 26 may also be added in addition to the wrinkle-smoothing unit 14. The above-mentioned difference is briefly described with reference to each of FIG. 16 and FIG. 17. In the upper portion of the stationary conveyor 13b in the transverse conveyance unit 4, the surface plate 24 configured to guide the glass film ribbon G on the periphery of the cleaving position, and the unnecessary portion supporting part 25 and the effective portion supporting part 26, which are configured to respectively support and guide the unnecessary portion G1 and the effective portion G2 (immediately) after the glass film ribbon G is cleaved, are installed at fixed positions. Now, those configurations are described in detail.

Figure 18:
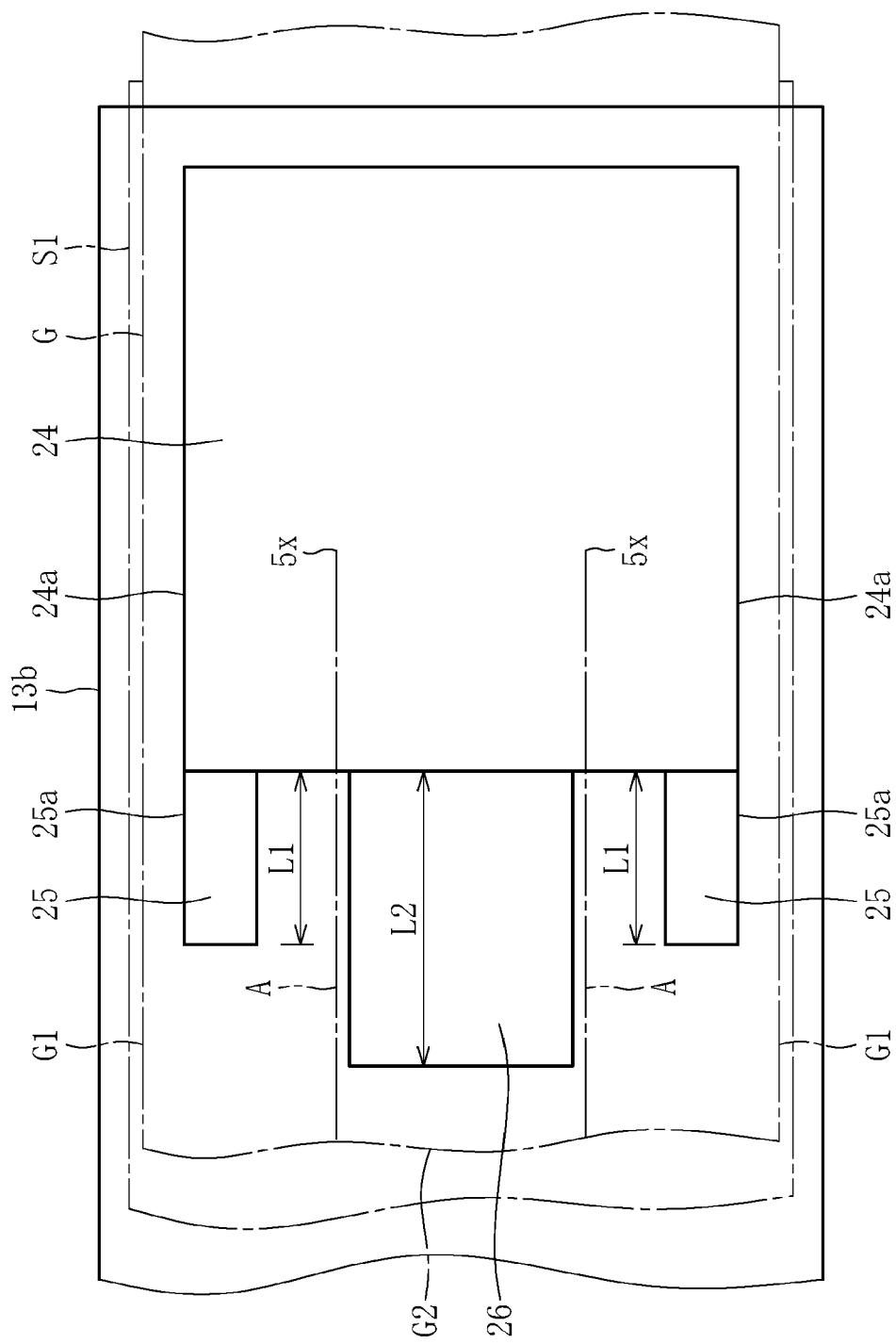
FIG. 18 is an enlarged plan view for illustrating the main portion of the glass film ribbon manufacturing device according to the fifth embodiment of the present invention.

FIG. 18 is a plan view for illustrating an entire configuration of the surface plate 24, the unnecessary portion supporting part 25, and the effective portion supporting part 26. As illustrated in FIG. 18, the surface plate 24 is a plate-like body having a substantially rectangular shape and installed at a fixed position so that the cleaving position 5x for the glass film ribbon G is located above the surface plate 24. Then, on a downstream end in the conveyance direction of the surface plate 24, the unnecessary portion supporting parts 25 are formed to protrude from both the end portions in the width direction, and the effective portion supporting part 26 is formed to protrude from the center side in the width direction between the unnecessary portion supporting parts 25. Note that, both edges 24a on the outer sides in the width direction of the surface plate 24 and edges 25a on the outer sides in the width direction of the unnecessary portion supporting parts 25 are connected to each other linearly. In this case, the unnecessary portion supporting part 25 and the effective portion supporting part 26 both have a substantially rectangular shape, and a dimension L1 of the unnecessary portion supporting part 25 protruding from the downstream end in the conveyance direction of the surface plate 24 is from 0.5 time to 3 times of the width of the unnecessary portion G1. Further, a dimension L2 of the effective portion supporting part 26 protruding from the downstream end in the conveyance direction of the surface plate 24 is 1 time to 3 times of the dimension L1 of the unnecessary portion supporting part 25. Note that, as can be understood from FIG. 18, both the ends in the width direction of the conveyance sheet ribbon S1 extend off both the ends in the width direction of the glass film ribbon G, and both the ends in the width direction of the stationary conveyor 13b extend off both the ends in the width direction of the conveyance sheet ribbon S1. Note that, in the illustrated example, both the ends in the width direction of the conveyance sheet ribbon S1 extend off both the ends in the width direction of the glass film ribbon G. However, on the contrary, both the ends in the width direction of the glass film ribbon G may extend off both the ends in the width direction of the conveyance sheet ribbon S1.

Figure 19:
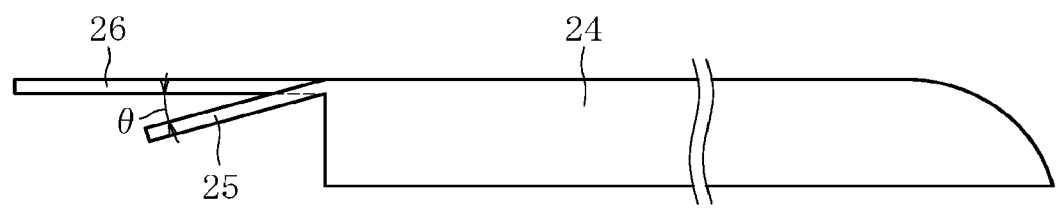
FIG. 19 is an enlarged side view for illustrating the main portion of the glass film ribbon manufacturing device according to the fifth embodiment of the present invention.

Then, as illustrated in FIG. 19, in this embodiment, both the unnecessary portion supporting part 25 and the effective portion supporting part 26 are thinner than the surface plate 24 and formed to protrude from an upper end portion on the downstream end in the conveyance direction of the surface plate 24. In this case, an upper surface of the effective portion supporting part 26 extends in the same direction as that of an upper surface of the surface plate 24 in a state of being flush therewith, whereas an upper surface of the unnecessary portion supporting part 25 is inclined downward to the downstream side in the conveyance direction from the upper surface of the surface plate 24. An inclination angle θ in this case is preferably from 0.5° to 45°, more preferably from 1° to 10°. Note that, the upper surface of the unnecessary portion supporting part 25 may extend in the same direction as that of the upper surface of the surface plate 24 in a state of being flush therewith, and in this case, it is preferred that the upper surface of the effective portion supporting part 26 be inclined upward to the downstream side in the conveyance direction from the upper surface of the surface plate 24. The inclination angle in this case is also set to the same as the above-mentioned angle θ.

Figure 20:
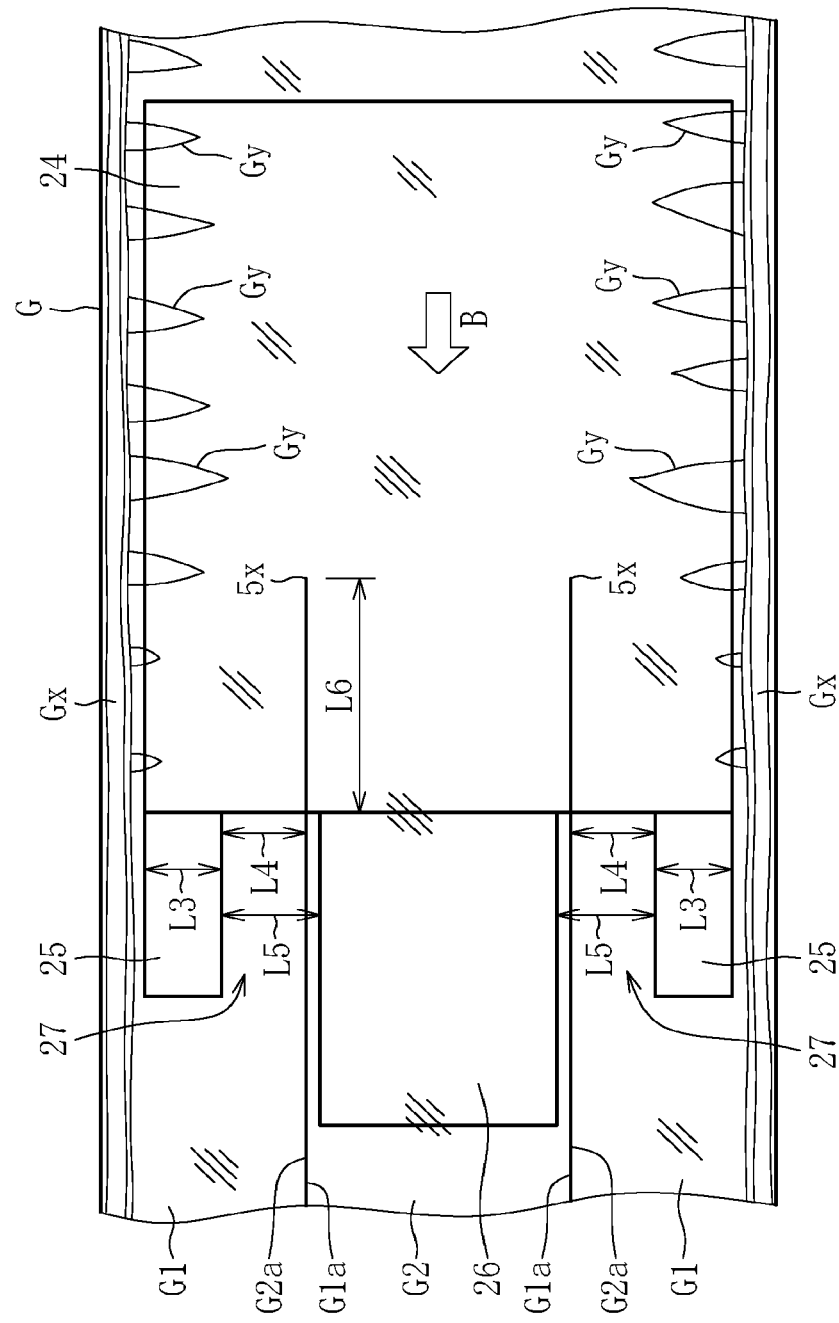
FIG. 20 is an enlarged plan view for illustrating the main portion of the glass film ribbon manufacturing device according to the fifth embodiment of the present invention.

FIG. 20 is a schematic plan view for illustrating the surface plate 24, the unnecessary portion supporting part 25, the effective portion supporting part 26, and the glass film ribbon G (G1, G2) in a cleaved state, and for convenience, the conveyance sheet ribbon and the conveyors are not shown. As illustrated in FIG. 20, the glass film ribbon G is cleaved at the cleaving position 5x while being conveyed in the direction of the arrow B, and hence, on the downstream side thereof, a cleaving end surface G1a of the unnecessary portion G1 including the selvage portion Gx and a cleaving end surface G2a of the effective portion G2 are formed. Then, gaps 27 in the width direction are each formed between the cleaving end surface G2a of the effective portion G2 and an inward end in the width direction of the unnecessary portion supporting part 25, and a length L3 in the width direction of the unnecessary portion supporting part 25 is set to preferably from 0.1 time to 2.0 times, more preferably from 0.2 time to 0.5 time, still more preferably from 0.25 time to 0.3 time of a dimension L4 in the width direction of the gap 27 in the width direction. Note that, the cleaving end surfaces G2a of the effective portions G2 respectively slightly extend off both the end portions in the width direction of the effective portion supporting part 26, and hence the same relationship also holds in gaps formed between both the ends in the width direction of the effective portion supporting part 26 and the inward ends in the width direction of the unnecessary portion supporting parts 25. Thus, the length L3 in the width direction of the unnecessary portion supporting part 25 may be preferably from 0.1 time to 2.0 times, more preferably from 0.2 time to 0.5 time, still more preferably from 0.25 time to 0.3 time of a dimension L5 in the width direction in the gap. Further, a dimension L6 from the cleaving position 5x of the glass film ribbon G to the downstream end in the conveyance direction of the surface plate 24 is preferably from 0.5 time to 3 times of the width of the effective portion G2.

Figure 21:
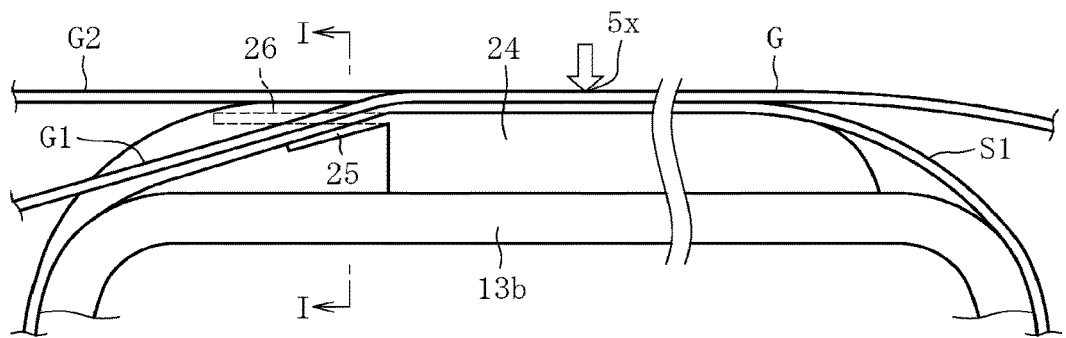
FIG. 21 is an enlarged side view for illustrating the main portion of the glass film ribbon manufacturing device according to the fifth embodiment of the present invention.

As can be understood from FIG. 20, when the unnecessary portion supporting part 25 supports the unnecessary portion G1 after the glass film ribbon G is cleaved, the selvage portion Gx of the unnecessary portion G1 is put into a state of protruding outward from an outward end in the width direction of the unnecessary portion supporting part 25. Further, in overall view, the unnecessary portion supporting part 25 supports a position closer to the outer side in the width direction of the unnecessary portion G1. Then, as illustrated in FIG. 21, a distance between a conveyance track of the unnecessary portion G1, which is formed by the unnecessary portion supporting part 25, and a conveyance track of the effective portion G2, which is formed by the effective portion supporting part 26, is gradually increased as approaching to the downstream side in the conveyance direction. Thus, during a period in which the effective portion G2 is sent while being supported by the effective portion supporting part 26 and the unnecessary portion G1 is sent while being supported by the unnecessary portion supporting part 25 after the glass ribbon G is cleaved, the conveyance sheet ribbon S1 is in a state of being freely deflected, and the unnecessary portion G1 and the effective portion G2 are supported at different positions in a vertical direction as illustrated in FIG. 22.

With the above-mentioned configuration, the glass film ribbon G that has reached the transverse conveyance unit 4 via the direction changing unit 3 from the forming unit 2 illustrated in FIG. 16 is conveyed in the transverse direction by the first drive conveyor 13a and then conveyed in the transverse direction so as to be transferred to the upper portion of the stationary conveyor 13b. In this case, in the upper portion of the stationary conveyor 13b, the glass film ribbon G, and the unnecessary portion G1 and the effective portion G2 after cleaving of the glass film ribbon G are conveyed by the conveyance sheet ribbon S1 that moves while sliding on the surface plate 24, the unnecessary portion supporting part 25, and the effective portion supporting part 26.

As illustrated in FIG. 20, while the glass film ribbon G is approaching the cleaving position 5x on the surface plate 24 in the upper portion of the stationary conveyor 13b, wrinkles Gy along a direction orthogonal to the conveyance direction are generated in an inner part in the width direction of the selvage portion Gx. Therefore, in the case where the unnecessary portion G1 passes through the downstream end in the conveyance direction of the surface plate 24 to be supported by the unnecessary portion supporting part 25, the selvage portion Gx is not supported, and the inner part in the width direction (part in which the wrinkles Gy are generated) is supported. With this, the unnecessary portion G1 is conveyed while being supported by the unnecessary portion supporting part 25 in a state in which the wrinkles Gy are eliminated. Further, the selvage portion Gx having large weight protrudes to hang down from the outward end in the width direction of the unnecessary portion supporting part 25, and hence the unnecessary portion G1 is to be separated from the effective portion G2. In addition, the unnecessary portion supporting part 25 is put into a state of supporting the unnecessary portion G1 without being influenced by waviness caused in the selvage portion Gx. As a result of the foregoing, when the unnecessary portion G1 is conveyed while being supported by the unnecessary portion supporting part 25, the vibration and the like that may occur in the unnecessary portion G1 are suppressed effectively, and the situation in which the cleaving end surface G1a of the unnecessary portion G1 and the cleaving end surface G1a of the effective portion G2 rub against each other frequently is avoided. In this case, even while the unnecessary portion G1 is approaching the unnecessary portion supporting part 25 from the cleaving position 5x, the selvage portion Gx protrudes outward from each of both the ends in the width direction of the surface plate 24. Therefore, tension directed outward acts on the inner part in the width direction of the selvage portion Gx due to the own weight thereof, and the tension causes a force for separating the unnecessary portion G1 from the effective portion G1. Thus, even when the glass film ribbon G is positioned on the surface plate 24, the unnecessary portion G1 is conveyed as a part independent from the effective portion G2 after cleaving at the cleaving position 5x. Therefore, most of the wrinkles Gy are eliminated with the above-mentioned tension, and the interference between the cleaving end surface G1a of the unnecessary portion G1 and the cleaving end surface G1a of the effective portion G2 is effectively suppressed. Note that, the cleaving position 5x of the glass film ribbon G is separated by the dimension L6 from the upstream end in the conveyance direction of the unnecessary portion supporting part 25 for the following reason. That is, as illustrated in FIG. 21, the conveyance track of the unnecessary portion supporting part 25 is different from that of the effective portion supporting part 26, and hence if the cleaving position 5x is positioned at the upstream end in the conveyance direction of the unnecessary portion supporting part 25, an inappropriate stress acts on the cleaving position 5x, with the result that proper cleaving may not be performed.

Figure 22:
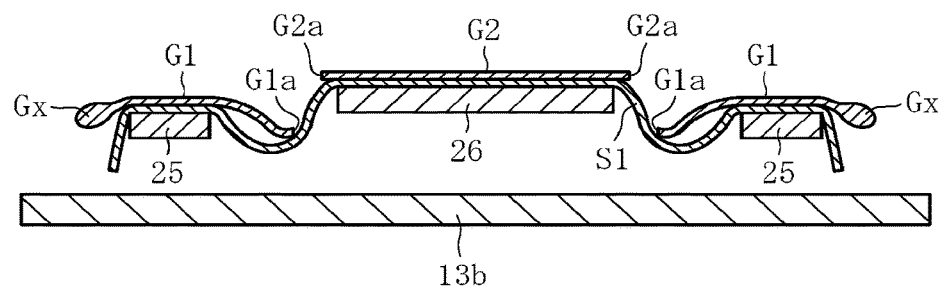
FIG. 22 is an enlarged vertical sectional view taken along the line I-I of FIG. 21.

Further, the gap 27 in the width direction having a sufficient size is located between the unnecessary portion supporting part 25 and the effective portion G2 (effective portion supporting part 26), and hence a peripheral portion of an inward end in the width direction of the unnecessary portion G1 supported by the unnecessary portion supporting part 25 is put into a state of hanging down as illustrated in FIG. 22. Specifically, the unnecessary portion supporting part 25 supports the position closer to the outer side in the width direction of the unnecessary portion G, and hence the unnecessary portion G1 is supported by the unnecessary portion supporting part 25 in a state in which a protruding dimension of the unnecessary portion G1 to the inner side in the width direction is set to be large. This causes the peripheral portion of the inward end in the width direction of the unnecessary portion G1 to hang down significantly. With this, the cleaving end surface G1a of the unnecessary portion G1 and the cleaving end surface G2a of the effective portion G2 are separated from each other, and hence the situation in which the cleaving end surface G1a of the unnecessary portion G1 and the cleaving end surface G2a of the unnecessary portion G2 rub against each other is avoided further reliably. Such advantage becomes more outstanding due to the difference between the conveyance track of the unnecessary portion supporting part 25 and that of the effective portion supporting part 26 as illustrated in FIG. 21. Note that, as presumed from FIG. 22, even when the conveyance track of the unnecessary portion supporting part 25 is the same as that of the effective portion supporting part 26, the unnecessary portion G1 supported by the unnecessary portion supporting part 25 is in a state in which the peripheral portion of the inward end in the width direction thereof hangs down significantly. Therefore, the situation in which the cleaving end surface G1a of the unnecessary portion G1 and the cleaving end surface G2a of the effective portion G2 rub against each other can be avoided. In such case, the cleaving position 5x of the glass film ribbon G can be positioned at the upstream end in the conveyance direction of the unnecessary portion supporting part 25 or the vicinity thereof.

As described above, the unnecessary portion G1 that is conveyed while being supported by the unnecessary portion supporting part 25 is sent to a disposal unit (not shown) to be shredded. Meanwhile, the effective portion G2 that is conveyed while being supported by the effective portion supporting part 26 reaches the take-up unit 6 and is finally taken up into the glass roll R by rolling the glass film ribbon G (effective portion G2) and the protective sheet S around the roll core 18 in a laminated state in the same way as in FIG. 10 described above. The glass roll R thus obtained has high quality with extremely few scars of the cleaving end surfaces and the like.

Figure 23:
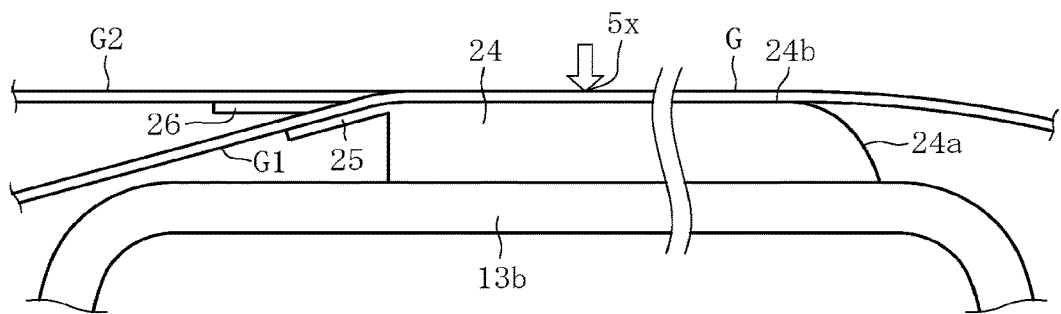
FIG. 23 is an enlarged side view for illustrating a main portion of a glass film ribbon manufacturing device according to a sixth embodiment of the present invention.
Figure 24:
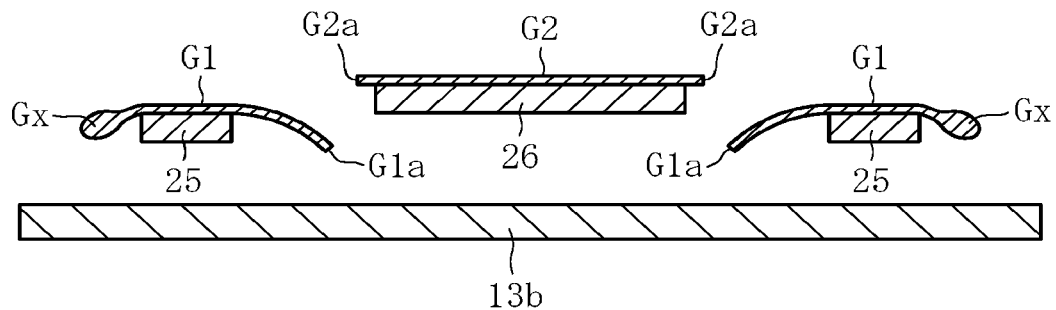
FIG. 24 is an enlarged vertical sectional view for illustrating the main portion of the glass film ribbon manufacturing device according to the sixth embodiment of the present invention.

FIG. 23 and FIG. 24 are views for illustrating a configuration of a main portion of a manufacturing device 1 according to a sixth embodiment of the present invention. As illustrated in FIG. 23 and FIG. 24, the manufacturing device 1 according to the sixth embodiment is different from the manufacturing device 1 according to the fifth embodiment described above in that, in the upper portion of the stationary conveyor 13b, the conveyance sheet ribbon is not interposed between each of the surface plate 24, the unnecessary portion supporting part 25, and the effective portion supporting part 26 and the glass film ribbon G (including the unnecessary portion G1 and the effective portion G2). Even with such configuration, the glass film ribbon G is conveyed while sliding on the upper surfaces of the surface plate 24, the unnecessary portion supporting part 25, and the effective portion supporting part 26 with a sending force from the upstream side and a tensile force from the downstream side, which act on the glass film ribbon G. In this case, an upstream end surface 24a of the surface plate 24 is curved to be connected to an upper surface 24b smoothly so that scars and the like are not caused by sliding on the lower surface of the glass film ribbon G. Even with such configuration, the same operation as that in the fifth embodiment described above is performed, and the same action and effect as those therein are obtained. Note that, in FIG. 23 and FIG. 24, the components common to the manufacturing device 1 according to the fifth embodiment described above are denoted by the same reference symbols, and the descriptions thereof are omitted.

Figure 25:
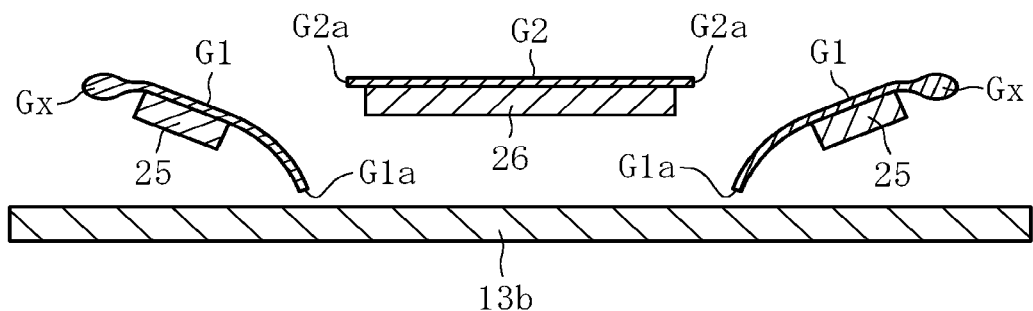
FIG. 25 is an enlarged vertical sectional view for illustrating a configuration of a main portion of a glass film ribbon manufacturing device according to a seventh embodiment of the present invention.

FIG. 25 is a view for illustrating a configuration of a main portion of a manufacturing device 1 according to a seventh embodiment of the present invention. As illustrated in FIG. 25, the manufacturing device 1 according to the seventh embodiment is different from the manufacturing device 1 according to the sixth embodiment described above in that the unnecessary portion supporting part 25 is inclined downward from the outer side in the width direction to the inner side in the width direction. Note that, in the seventh embodiment, in the same way as in the fifth embodiment described above, the conveyance sheet ribbon may be interposed between each of the surface plate, the unnecessary portion supporting part 25, and the effective portion supporting part 26 and the glass film ribbon G (including the unnecessary portion G1 and the effective portion G2). Further, even with the configuration of the seventh embodiment, the same operation as that in the sixth embodiment described above is performed, and the same action and effect as those therein are obtained. Note that, in FIG. 25, the components common to the manufacturing device 1 according to the sixth embodiment described above are denoted by the same reference symbols, and the descriptions thereof are omitted.

Figure 26:
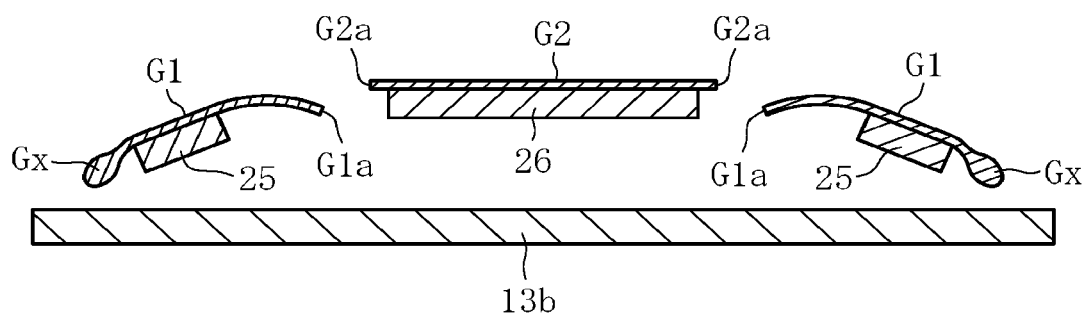
FIG. 26 is an enlarged vertical sectional view for illustrating a configuration of a main portion of a glass film ribbon manufacturing device according to an eighth embodiment of the present invention.

FIG. 26 is a view for illustrating a configuration of a main portion of a manufacturing device 1 according to an eighth embodiment of the present invention. As illustrated in FIG. 26, the manufacturing device 1 according to the eighth embodiment is different from the manufacturing device 1 according to the sixth embodiment described above in that the unnecessary portion supporting part 25 is inclined downward from the inner side in the width direction to the outer side in the width direction. Note that, even in the eighth embodiment, in the same way as in the fifth embodiment described above, the conveyance sheet ribbon may be interposed between each of the surface plate, the unnecessary portion supporting part 25, and the effective portion supporting part 26 and the glass film ribbon G (including the unnecessary portion G1 and the effective portion G2). Further, even with the configuration of the eighth embodiment, the same operation as that in the sixth embodiment described above is performed, and the same action and effect as those therein are obtained. Note that, in FIG. 26, the components common to the manufacturing device 1 according to the sixth embodiment described above are denoted by the same reference symbols, and the descriptions thereof are omitted.

Figure 27:
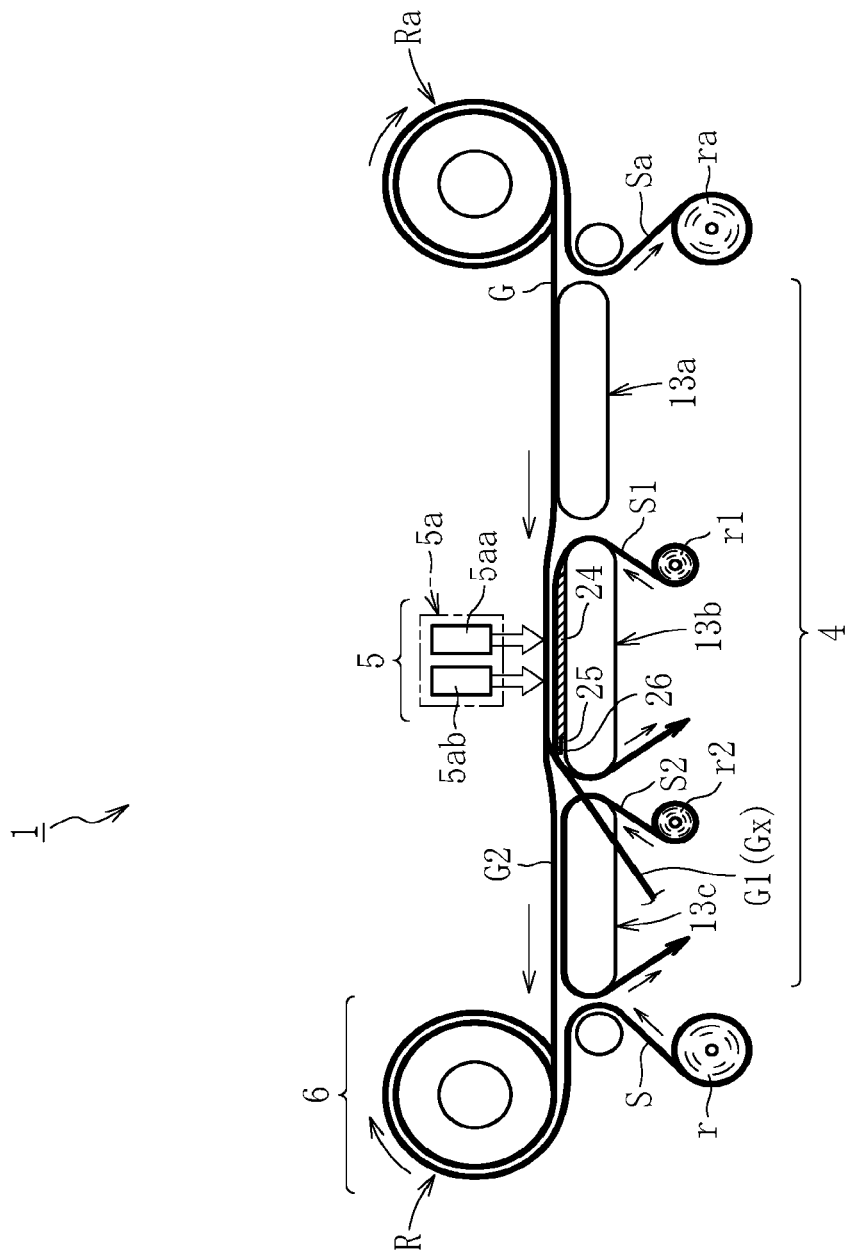
FIG. 27 is a schematic side view for illustrating an entire configuration of a glass film ribbon manufacturing device according to a ninth embodiment of the present invention.
Figure 28A:
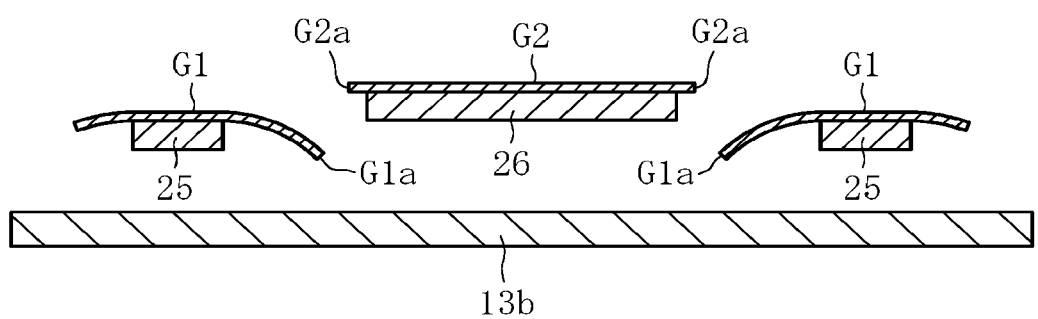
FIG. 28a is an enlarged vertical sectional view for illustrating an example of a main portion of the glass film ribbon manufacturing device according to the ninth embodiment of the present invention.
Figure 28B:
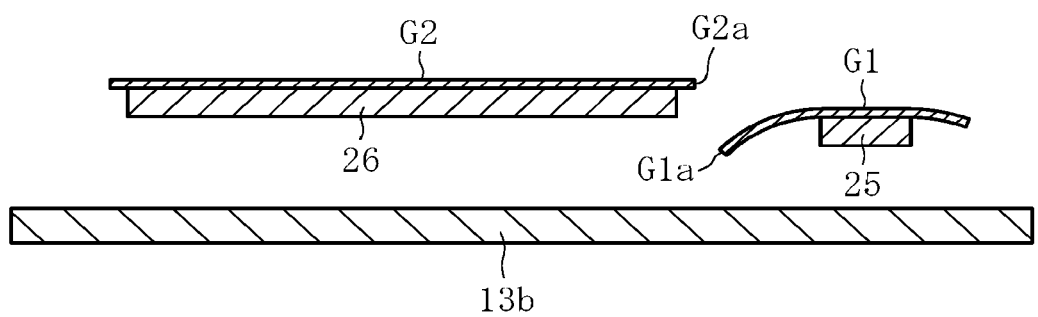
FIG. 28b is an enlarged vertical sectional view for illustrating another example of the main portion of the glass film ribbon manufacturing device according to the ninth embodiment of the present invention.

FIG. 27 is a schematic side view for schematically illustrating an entire configuration of a manufacturing device 1 according to a ninth embodiment of the present invention. As illustrated in FIG. 27, the manufacturing device 1 is used for carrying out a roll-to-roll process, and takes out the glass film ribbon G from one glass roll Ra (right side of FIG. 27) and takes up the glass film ribbon G into the other glass roll R (left side of FIG. 27). In this case, the glass film ribbon G is taken out from the one glass roll Ra, and along with this, the protective sheet Sa taken out from the one glass roll Ra is taken up into the sheet roll ra. Herein, in the case where the one glass roll Ra is obtained by taking up the glass film ribbon G from which the selvage portion has already been removed by cleaving, the unnecessary portion G1 is located in each of both the end portions in the width direction of the glass film ribbon G or only in one end portion in the width direction. Then, in order to resize the dimension in the width direction of the glass film ribbon G, the unnecessary portion G1 may be removed by cleaving. In such case, in the transverse conveyance unit 4, the unnecessary portion supporting part 25 is formed to protrude from each of both the end portions in the width direction or the one end portion in the width direction at the downstream end in the conveyance direction of the surface plate 24, and the effective portion supporting part 26 is formed to protrude from the center side in the width direction between the unnecessary portion supporting parts 25 at the downstream end in the conveyance direction of the surface plate 24. Thus, in the case where the unnecessary portions G1 are located in both the end portions in the width direction of the glass film ribbon G, as illustrated in FIG. 28a, a pair of unnecessary portions G1 after cleaving is supported by a pair of unnecessary portion supporting parts 25. Further, in the case where the unnecessary portion G1 is located only in the one end portion in the width direction of the glass film ribbon G, as illustrated in FIG. 28b, a single unnecessary portion G1 after cleaving is supported by a single unnecessary portion supporting part 25. The configurations other than the above-mentioned matters are the same as those of the manufacturing device 1 according to the sixth embodiment described above. Therefore, the components common to both the embodiments are denoted by the same reference symbols, and the descriptions thereof are omitted.

Note that, in the manufacturing devices 1 according to the fifth to ninth embodiments described above, the moving path of the glass film ribbon G from the direction changing unit 3 to the transverse conveyance unit 4 is not positioned below the moving path of the glass film ribbon G in the transverse conveyance unit 4. However, in the same way as in the embodiment illustrated in FIG. 14 described above, the manufacturing devices 1 according to the fifth to ninth embodiments may be constructed such that the glass film ribbon G drawn vertically downward from the forming unit 2 follows the following moving path. In the direction changing unit 3, the glass film ribbon G hangs down below the moving path in the transverse conveyance unit 4 and shifts upward to reach the transverse conveyance unit 4.

Further, in the fifth to ninth embodiments described above, the surface plate 24, the unnecessary portion supporting part 25, and the effective portion supporting part 26 are arranged on the stationary conveyor 13b in the transverse conveyance unit 4. However, the surface plate 24, the unnecessary portion supporting part 25, and the effective portion supporting part 26 may be arranged in an upper portion of a base portion installed in a fixed manner without using the stationary conveyor 13b.

Further, in the fifth to ninth embodiments described above, two drive conveyors are used as components of the transverse conveyance unit 4. However, instead of this, one drive conveyor may be used as a component of the transverse conveyance unit 4. Note that, in this case, it is necessary to install the surface plate 24, the unnecessary portion supporting part 25, and the effective portion supporting part 26 at fixed positions in a state of being isolated from the drive conveyor. Note that, three or more drive conveyors may be used as components of the transverse conveyance unit 4.

Further, in the fifth to ninth embodiments described above, the unnecessary portion supporting part 25 and the effective portion supporting part 26 are formed to protrude from the downstream end in the conveyance direction of the surface plate 24. However, in the case where the surface plate 24 and the second drive conveyor 13c are arranged closely to each other so that the effective portion G2 of the glass film ribbon G is conveyed so as to be smoothly transferred onto the second drive conveyor 13c on the downstream side, the effective portion supporting part 26 may not be provided.

Further, in the first to sixth embodiments described above, the conveyors 13a, 13b, and 13c arranged in the transverse conveyance unit 4 are each formed of a belt conveyor. However, instead of or in addition to the foregoing, a part or a whole of the conveyors may be constructed by appropriately combining roller conveyors having a configuration in which a plurality (a large number) of rollers rotate, a floating conveyance unit, and the like. Further, the unnecessary portion supporting part 25 may be formed of such roller conveyors and the like instead of the plate-like body.

Note that, in the above-mentioned appropriate embodiments, the overflow down-draw method is employed for forming the glass film ribbon G. However, instead of this method, other down-draw methods such as a slot down-draw method, a re-draw method, and the like may also be employed. In addition, as the method of forming the glass film ribbon G, a float method involving drawing a glass film ribbon from a float bath and conveying the glass film ribbon by a transverse conveyance unit may also be employed.

Further, all the embodiments described above have a configuration including the take-up unit 6 configured to take up, into a roll shape, the glass film ribbon G2 from which the selvage portion is removed by cleaving with the cleaving unit 5, to thereby form the glass roll R. However, all the embodiments described above may have such a configuration not including the take-up unit 6 that the glass film ribbon (effective portion G2) from which the unnecessary portion G1 is removed by cleaving with the cleaving unit 5 is cut into a rectangular shape by a predetermined length in the longitudinal direction, to thereby forma glass film laminate having a protective sheet interposed between a plurality of respective rectangular glass films.

REFERENCE SIGNS LIST 1 glass film ribbon manufacturing device
2 forming unit
3 direction changing unit
4 transverse conveyance unit
5 cleaving unit
5x cleaving position
6 take-up unit
13a first drive conveyor
13b stationary conveyor
13c second drive conveyor
14 wrinkle-smoothing unit
15 orthogonal rod-like body
16 bedplate
17 parallel rod-like body
20 raising body
21 holding body
24 surface plate
25 unnecessary portion supporting part
26 effective portion supporting part
G glass film ribbon
G1 unnecessary portion
G2 effective portion
Gx selvage portion
R glass roll
S1 conveyance sheet ribbon

The invention claimed is:

1. A glass film ribbon manufacturing method, comprising:
cleaving a glass film ribbon by a cleaving unit, which is arranged on a conveyance path of a transverse conveyance unit, along a preset cleaving line defining a boundary line between an unnecessary portion of the glass film ribbon on at least one end side in a width direction of the glass film ribbon and an effective portion of the glass film ribbon on a center side in the width direction of the glass film ribbon while conveying the glass film ribbon in a transverse direction by the transverse conveyance unit;
supporting, after the cleaving the glass film ribbon by the cleaving unit, a part of the unnecessary portion away from a cleaved side of the unnecessary portion by an unnecessary portion supporting part, the unnecessary portion supporting part being spaced away from the effective portion in the width direction such that a gap is present between the unnecessary portion supporting part and the effective portion,
wherein an end portion of the unnecessary portion at the cleaved side hangs down from the unnecessary portion supporting part into the gap due to a weight of the end portion of the unnecessary portion at the cleaved side such that a cleaved end surface of the unnecessary portion is separated from a cleaved end surface of the effective portion in a vertical direction.

2. The glass film ribbon manufacturing method according to claim 1,
wherein the unnecessary portion has a selvage portion that is thicker than the effective portion at an end portion of the unnecessary portion that is opposite to the end portion of the unnecessary portion at the cleaved side, and
wherein the unnecessary portion supporting part is configured to support the part of the unnecessary portion in a state in which the selvage portion protrudes to an outer side in the width direction.

3. The glass film ribbon manufacturing method according to claim 1, wherein a distance from a center portion of the unnecessary portion supporting part to the end portion of the unnecessary portion at the cleaved side in the width direction is longer than a distance from the center portion of the unnecessary portion supporting part to an end portion of the unnecessary portion that is opposite to the end portion of the unnecessary portion at the cleaved side in the width direction.

4. The glass film ribbon manufacturing method according to claim 1, wherein the unnecessary portion supporting part has a length in the width direction of from 0.1 time to 2.0 times of a length of the gap in the width direction.

5. The glass film ribbon manufacturing method according to claim 1, wherein an end portion of the effective portion at a cleaved side of the effective portion protrudes into the gap from an effective portion supporting part.

6. The glass film ribbon manufacturing method according to claim 5, wherein a distance between a conveyance track of the unnecessary portion, which is formed by the unnecessary portion supporting part, and a conveyance track of the effective portion, which is formed by the effective portion supporting part, is gradually increased in the vertical direction as approaching to a downstream side in a conveyance direction.

7. The glass film ribbon manufacturing method according to claim 5, wherein the unnecessary portion supporting part and the effective portion supporting part are formed to protrude from a downstream end in the conveyance direction of a surface plate installed at a fixed position along the conveyance path of the transverse conveyance unit.

8. The glass film ribbon manufacturing method according to claim 7,
   wherein the transverse conveyance unit comprises a conveyance sheet ribbon having flexibility, which is interposed between each of the surface plate, the unnecessary portion supporting part, and the effective portion supporting part and the glass film ribbon, and
   wherein the conveyance sheet ribbon is configured to convey the glass film ribbon by moving a lower surface of the conveyance sheet ribbon while sliding on the surface plate, the unnecessary portion supporting part, and the effective portion supporting part.

\* \* \* \* \*